US011270445B2

(12) United States Patent
Frank et al.

(10) Patent No.: US 11,270,445 B2
(45) Date of Patent: Mar. 8, 2022

(54) JOINT ESTIMATION WITH SPACE-TIME ENTROPY REGULARIZATION

(71) Applicant: THE REGENTS OF THE UNIVERSITY OF CALIFORNIA, Oakland, CA (US)

(72) Inventors: Lawrence R. Frank, San Diego, CA (US); Vitaly L. Galinsky, San Diego, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 16/491,144

(22) PCT Filed: Mar. 6, 2018

(86) PCT No.: PCT/US2018/021235
§ 371 (c)(1),
(2) Date: Sep. 4, 2019

(87) PCT Pub. No.: WO2018/165221
PCT Pub. Date: Sep. 13, 2018

(65) Prior Publication Data
US 2020/0051255 A1 Feb. 13, 2020

Related U.S. Application Data

(60) Provisional application No. 62/467,713, filed on Mar. 6, 2017.

(51) Int. Cl.
*G06T 7/30* (2017.01)
*G06T 7/00* (2017.01)

(52) U.S. Cl.
CPC .............. *G06T 7/30* (2017.01); *G06T 7/0012* (2013.01); *G06T 2207/10044* (2013.01); *G06T 2207/10092* (2013.01); *G06T 2207/30016* (2013.01)

(58) Field of Classification Search
CPC .............. G06K 2209/051; G06K 9/00; G06K 9/00496; G06T 2207/10032;
(Continued)

(56) References Cited

U.S. PATENT DOCUMENTS

| 6,611,615 B1 | 8/2003 | Christensen |
| 6,992,484 B2 * | 1/2006 | Frank ............... G01R 33/56341 324/307 |

(Continued)

FOREIGN PATENT DOCUMENTS

| WO | 2014144331 A1 | 9/2014 | |
| WO | WO-2015039054 A1 * | 3/2015 | ........... G06T 11/003 |

(Continued)

OTHER PUBLICATIONS

Ashburner, John; "A fast diffeomorphic image registration algorithm", NeuroImage, 2007, vol. 38, pp. 95-113.
(Continued)

*Primary Examiner* — Ian L Lemieux
(74) *Attorney, Agent, or Firm* — Eleanor Musick; Torrey Pines Law Group, PC

(57) ABSTRACT

A method for registering multiple data types of diverse modalities for a target volume includes acquiring at least at least two datasets associated with the target volume where the at least two datasets having different modalities. Using information field theory and entropy spectrum pathways theory, a local connectivity matrix is constructed for one or both of spatial connectivity and temporal connectivity for each of the datasets. The local connectivity matrices for the datasets are fused into a common coupling matrix and the datasets are merged to generate a registered image displaying the spatial and temporal features within the target volume.

23 Claims, 19 Drawing Sheets
(4 of 19 Drawing Sheet(s) Filed in Color)

(58) Field of Classification Search
CPC . G06T 2207/10044; G06T 2207/10088; G06T 2207/10092; G06T 2207/30016; G06T 2207/30192; G06T 7/0012; G06T 7/30
See application file for complete search history.

(56) References Cited

U.S. PATENT DOCUMENTS

| | | | |
|---|---|---|---|
| 7,106,891 | B2 | 9/2006 | Wyman et al. |
| 7,639,896 | B2 | 12/2009 | Sun et al. |
| 7,672,790 | B2 | 3/2010 | McGraw et al. |
| 7,773,074 | B2 | 8/2010 | Arenson et al. |
| 8,068,650 | B2 * | 11/2011 | Kumar ............... G06T 7/20 382/128 |
| 8,180,132 | B2 * | 5/2012 | Gorges ............... G06T 7/33 382/131 |
| 8,742,754 | B2 | 6/2014 | Hasan |
| 8,744,211 | B2 * | 6/2014 | Owen ............... A61B 8/483 382/278 |
| 9,020,215 | B2 * | 4/2015 | Chen ............... G06T 7/33 382/128 |
| 9,092,691 | B1 * | 7/2015 | Beaumont ............... G06T 7/0014 |
| 9,204,835 | B2 | 12/2015 | Parsey et al. |
| 9,404,986 | B2 | 8/2016 | White et al. |
| 9,453,940 | B2 | 9/2016 | Sasaki |
| 9,645,212 | B2 * | 5/2017 | Frank ............... A61B 5/0042 |
| 9,754,371 | B2 * | 9/2017 | Kateb ............... G06K 9/0014 |
| 10,297,022 | B2 | 5/2019 | Frank et al. |
| 10,297,023 | B2 * | 5/2019 | Grodzki ............... G06T 11/006 |
| 10,789,713 | B2 | 9/2020 | Frank et al. |
| 10,909,414 | B2 | 2/2021 | Frank et al. |
| 10,949,987 | B2 * | 3/2021 | Liu ............... G06T 7/30 |
| 2005/0054910 | A1 | 3/2005 | Tremblay et al. |
| 2005/0119834 | A1 | 6/2005 | Kita et al. |
| 2005/0154701 | A1 | 7/2005 | Parunak et al. |
| 2005/0213809 | A1 | 9/2005 | Lees et al. |
| 2006/0259282 | A1 | 11/2006 | Failla et al. |
| 2007/0036402 | A1 | 2/2007 | Cahill et al. |
| 2007/0049817 | A1 | 3/2007 | Preiss et al. |
| 2007/0087756 | A1 | 4/2007 | Hoffberg |
| 2008/0091388 | A1 | 4/2008 | Failla et al. |
| 2008/0287796 | A1 | 11/2008 | Kiraly et al. |
| 2009/0010540 | A1 * | 1/2009 | Mullick ............... G06T 7/38 382/170 |
| 2009/0080604 | A1 | 3/2009 | Shores et al. |
| 2009/0161933 | A1 | 6/2009 | Chen |
| 2010/0172567 | A1 | 7/2010 | Prokoski |
| 2011/0201935 | A1 | 8/2011 | Collet-Billon et al. |
| 2011/0255763 | A1 | 10/2011 | Bogoni et al. |
| 2011/0297369 | A1 | 12/2011 | Kumaran et al. |
| 2013/0259340 | A1 | 10/2013 | Tseng et al. |
| 2013/0342206 | A1 | 12/2013 | Ugurbil |
| 2014/0153797 | A1 | 6/2014 | Wan et al. |
| 2014/0192046 | A1 | 7/2014 | Paragios et al. |
| 2014/0249787 | A1 | 9/2014 | López et al. |
| 2015/0363644 | A1 * | 12/2015 | Wnuk ............... G06K 9/6215 382/103 |
| 2016/0004972 | A1 | 1/2016 | Alboszta et al. |
| 2016/0110911 | A1 * | 4/2016 | Frank ............... A61B 5/0042 382/131 |
| 2016/0180526 | A1 | 6/2016 | Satoh et al. |
| 2016/0210742 | A1 | 7/2016 | Weiss et al. |
| 2016/0225146 | A1 * | 8/2016 | Frank ............... A61B 5/0042 |
| 2016/0317038 | A1 * | 11/2016 | Zalev ............... A61B 5/725 |
| 2016/0343127 | A1 * | 11/2016 | Miller ............... A61B 5/055 |
| 2016/0343129 | A1 | 11/2016 | Novikov et al. |
| 2017/0085855 | A1 * | 3/2017 | Roberts ............... G06T 3/0068 |
| 2017/0103533 | A1 | 4/2017 | Brokman et al. |
| 2017/0337824 | A1 | 11/2017 | Chen |
| 2018/0285687 | A1 * | 10/2018 | Frank ............... G06K 9/6271 |
| 2019/0117072 | A1 * | 4/2019 | Pereira ............... A61B 5/7267 |
| 2019/0154779 | A1 * | 5/2019 | Yaesoubi ............... G01R 33/5608 |
| 2019/0206057 | A1 * | 7/2019 | Cranmer ............... G06T 7/0014 |
| 2020/0167694 | A1 * | 5/2020 | Pisner ............... G06F 16/9024 |
| 2020/0202531 | A1 * | 6/2020 | Frank ............... G06T 7/0016 |
| 2020/0386839 | A1 * | 12/2020 | Frank ............... G01R 33/56341 |
| 2021/0027207 | A1 * | 1/2021 | Bongio Karrman ... G06N 20/00 |

FOREIGN PATENT DOCUMENTS

| | | | | |
|---|---|---|---|---|
| WO | WO-2016176684 | A1 * | 11/2016 | ............ G06K 9/6247 |
| WO | WO-2017132403 | A1 * | 8/2017 | ............ G06T 7/0016 |

OTHER PUBLICATIONS

Assemial et al., "Recent advances in diffusion MRI modeling: Angular and radial reconstruction", Elsevier, Medical Image Analysis, 15 (2011) 369-396.

Balmforth et al., Pattern formation in hamiltonian systems with continuous spectra a normal form single wave model; Mar. 2013.

Balmforth, N.J. et al. "Pattern formation in Hailtonian systes with continuous spectra; a normal-form single-wave model." In: arXiv preprint arXiv:1303.0065. Mar. 1, 2013 from https://arxiv.org/pdf/1303.0065.pdfdownloaded on Mar. 10, 2016.

Behrens, T.E.J. et al., Probabilistic diffusion fractography with multiple fibre orientations: What can we gain? NeuroImage vol. 34 (2007) pp. 144-155.

Bista, Sujal et al., Visualization of Brain Microstructure through Spherical Harmonics Illumination of High Fidelity Spatio-Angular Fields; IEEE Trans Vis Comput Graph, Dec. 2014; 20(12):2416-2525.

Burda, Z. et al., The various facets of random walk entropy, presented at the 22nd Marian Smoluchowski Symposium on Statistical Physics, Zakopane, Poland, Sep. 12-17, 2009, 40 pages.

Campbell, Jennifer S.W. et al., Diffusion Imaging of White Matter Fibre Tracts, Thesis submitted to McGill University, Nov. 8, 2004, Montreal, Canada, copyright Jennifer Campbell, 2004, 183 pages.

Cargo, M. Multidimensional quantum normal forms, Moyal star product and torus quantization, Jul. 14, 2005.

Cargo, Matthew et al., "Multidimensional quantum normal forms, Moyal star product, and torus quantization," In arXiv:math-ph/0507032v1, Jul. 14, 2005 [online] [retrieved on Mar. 16, 2017].

Chang, Ping et al., "Predictability of Linear Coupled Systems. Part 1: Theoretical Analyses" Journal of Climate, Apr. 2004, p. 1474-1486.

Chung, Moo K. et al., Encoding cortical surface by spherical harmonics, Statistica Sinica vol. 18 (2008), 1269-1291.

Descoteaux, Maxime et al., Deterministic and probabilistic Q-Ball tractctography: from diffusion to sharp fiber distributions. No. 6273, Aug. 2007, Theme BIO, 36 pages.

Enrvik, Aron, 3D visualization of weather radar data, Thesis project in computer graphics at Linkoping University, Linkoping, Jan. 2002, LITH-ISY-EX-3252-2002, 92 pgs.

Frank, Lawrence R. et al., Information pathways in a discorded lattice, Physical Review, E89, 032142 (2014), 11 pgs.

Galinsky, Vitaly L., et al., A Unified Theory of Neuro-MRI Shows Scale-Free Nature of Connectivity Modes, Neural Computation 29, 1441-1467 (2017).

Galinsky, Vitaly L. et al. "Simultaneous Multi-Scale Diffusion Estimation and Tractography Guided by Entropy Spectrum Pathways," IEEE Transactions on Medical Imaging, Dec. 18, 2014.

Galinsky, Vitaly L. et al., Automated segmentation and shape characterization of volumetric data, NeuroImage vol. 92 (2014) pp. 156-168.

Goncalves, Vitor, Interaction and visualization techniques for volumetric data of various scalar modalities ntegration of visualization and interaction, Electronica E. Telecomunicacoes, vol. 5, No. 3, Jun. 2011, pp. 344-351.

Huang, Heng, et al., Functional analysis of cardiac MR images using SPHARM modeling, Proc. SPIE 5747, Medical maging 2005: Image Processing, May 5, 2005,1384; doi:10.1117/12.595954.

Le Bihan, Denis, Diffusion, Confusion and Functional MRI, NeuroImage, 2011, doi: 10.1016/j.neuroimage.2011.09.058, 6 pages.

Lu, Meng, et al. Snake-based brain white matter fiber reconstruction, Bio-Medical Materials and Engineering vol. 24 [2014] pp. 2945-2953.

(56) References Cited

OTHER PUBLICATIONS

Miller, Michael I. et al., "Collaborative Computational Anatomy: An MRI Morphometry Study of the Human Brain Via Diffeomorphic Metric Mapping", Human Brain Mapping, 2009, vol. 30., pp. 2132-2141.
Mukherjee, P. et al., Diffusion tensor MR imaging and fiber fractography: technical considerations, AJNR Am J. Neuroradiol vol. 29, May 2009, pp. 843-852.
Mukherjee, P. et al., Diffusion tensor MR imaging and fiber fractography: theoretic underpinnings, AJNR Am J. Neuroradiol vol. 29, Apr. 2008, pp. 632-641.
PCT/US2014/055712, International Search Report/Written Opinion dated Dec. 8, 2014, 15 pages.
PCT/US2016/030446, International Search Report and Written Opinion, dated Aug. 8, 2016, 15 pages.
PCT/US2016/030446, Written Opinion dated Aug. 8, 2016, 12 pages.
PCT/US2017/015173 International Search Report and Written Opinion dated Apr. 12, 2017, 9 pages.
PCT/US2018/021235; International Search Report and Written Opinion dated Jul. 10, 2018; 9 pages.
Peters, J.F., et al., Classification of meteorological volumetric radar data using rough set methods, Pattern Recognition Letters, vol. 24 (2003) pp. 911-920.
Schoelkopf, Bernhard et al. Nonlinear Component Analysis as a Kernel Eigenvalue Problem, Neural Computation, 10,1299-1319 (1998).
Senjem, Matthew L., et al., Comparison of different methodological implementations of Voxel-based morphometry in neurodegenerative disease, Neuroimage vol. 26(2), Jun. 2005, pp. 600-608.
Setsompop, K et al., (2013), Pushing the limits of in vivo diffusion MRI for the Human Connectome Project NeuroImage, vol. 80, Oct. 15, 2013; pp. 220-233.
Shaw, Christopher D., et al., Real-time weather data on terrain, Proc. SPIE 4368, Visualization of Temporal and Spatial Data for Civilian and Defense Applications, Aug. 23, 2001, 8 pages.
Sinatra, Roberta, et al., Maximal-entropy random walks in complex networks with limited information, Physical Review vol. 83, 030103(R), 2011, 4 pages.
Styner, Martin, Statistical shape analysis of brain structures using SPHARM-PDM, Insight Journal, MICCAI 2006 Dpensouice Workshop, 7 pages.
Tournier, Jacques-Donald, et al., Diffusion tensor imaging and beyond, Magn Reson Med. Vol. 65(6), Jun. 2011, pp. 1532-1556.
Galinsky, Vitaly L et al., Joint Estimation of Effective BrainWave Activation Modes using EEG/MEG Sensor Arrays and Multi-modal MRI vols. Neural Computation 30,1725-1749 (2018).

* cited by examiner

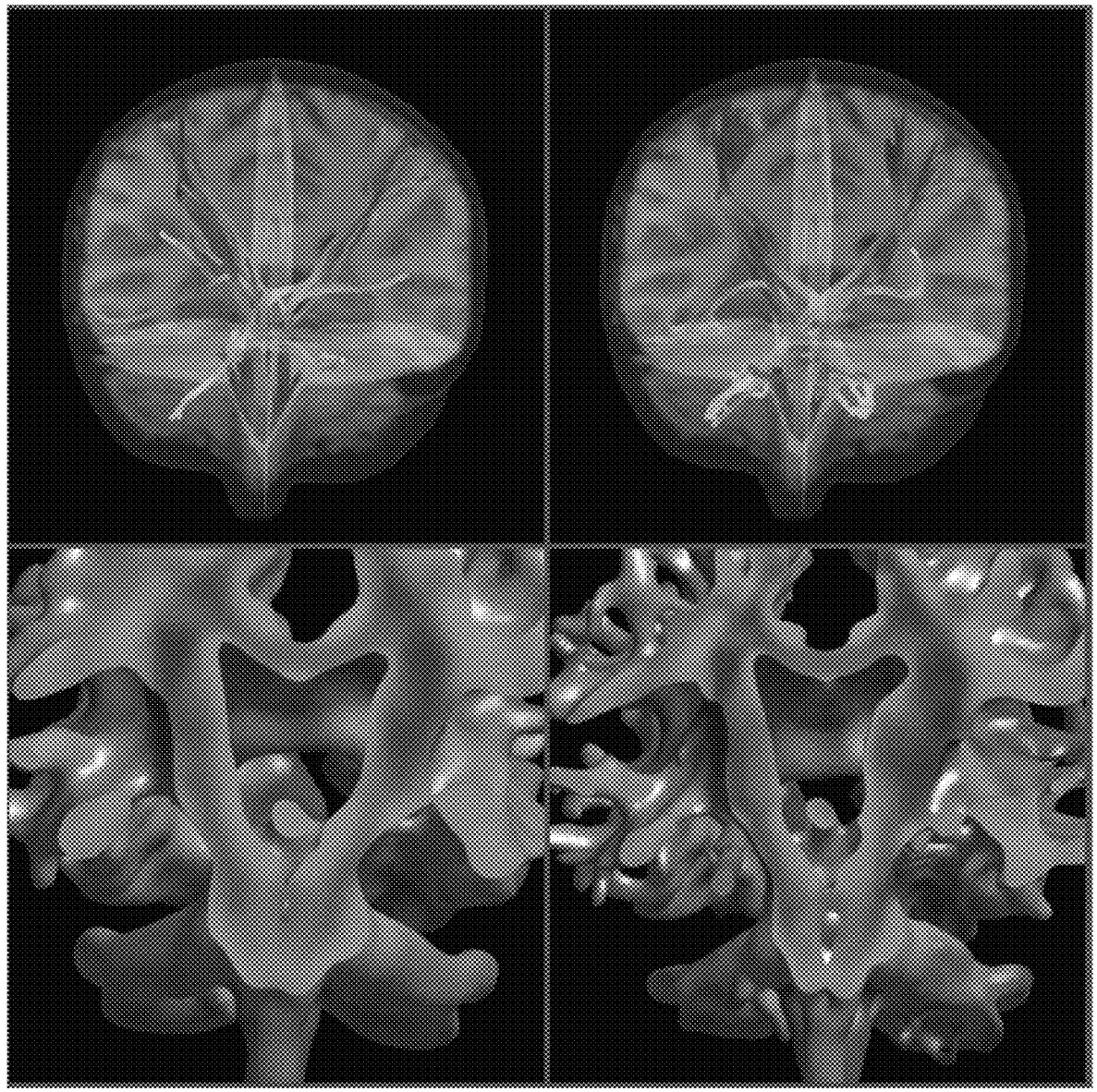

JOINT ESTIMATION WITH SPACE-TIME ENTROPY REGULARIZATION

RELATED APPLICATIONS

This application is a 371 national stage filing of International Application No. PCT/US2018/021235, filed Mar. 6, 2018, which claims the benefit of the priority of U.S. Application No. 62/467,713, filed Mar. 6, 2017, which are incorporated herein by reference in its entirety.

GOVERNMENT RIGHTS

This invention was made with government support under Grant No. MH096100 awarded by the National Institutes of Health and Grant No. DBI-1147260 awarded by the National Science Foundation. The government has certain rights in the invention.

BACKGROUND

Technology has provided myriad ways and sophisticated instrumentation to collect data in many forms—electromagnetic signals, images, spectral data, temporal data, physical and mechanical data, and more, that can be used alone or in combination to measure and model complex systems. Challenges in extracting useful knowledge from such data are ubiquitous in the sciences, ranging from extracting a signal from a noisy environment to development of predictive models of complex systems based on huge volumes of multivariate data.

In a wide range of scientific disciplines, experimenters are faced with the problem of discerning spatial-temporal patterns in data acquired from exceedingly complex physical systems in order to characterize the structure and dynamics of the observed system. Examples of fields of research that involve complex behavior include neuroimaging and weather pattern prediction. An example of a commercial application of modeling of complex systems includes analysis and optimization of networks, in which the image data might correspond to spatio-temporal dimensions of network coverage maps. The multiple time-resolved volumes of data acquired in these methods are from exceedingly complex and non-linear systems. Furthermore, the instrumentation in these fields continues to improve dramatically, facilitating increasingly more detailed data of spatial-temporal fluctuations of the working brain and of complex organized coherent storm scale structures such as tornadoes.

One of the great scientific questions that modern imaging systems are increasingly capable of addressing is the structure-function relationships in the human brain. Magnetic resonance imaging (MRI) provides a unique methodology for non-invasively acquiring high spatial resolution anatomical data (HRA) that are capable of characterizing morphological variations in exquisite detail, diffusion tensor imaging (DTI) that enables the construction of neural pathways, and functional MRI (FMRI), and in particular resting state functional MRI (rsFMRI), which can detect spatial-temporal changes in brain activity.

With the constantly increasing quality of data from neuroimaging methods using MRI (neuro-MRI), such as high resolution anatomical imaging (HRA), diffusion tensor imaging (DTI), and resting state functional MRI (rsFMRI), there is a significant and growing interest in the development of frameworks that can perform multimodal data fusion and analysis of these different modalities. Several methods have recently been developed based on modification or ad-hoc augmentation of an independent component analysis (ICA) approach (Bell & Sejnowski, 1995; Hyvarinen & Oja, 2000) including (Groves et al., 2011; Douaud et al., 2014; Mueller et al., 2013), or the Joint/Parallel ICA approaches (see the review of Calhoun et al. (2009)). However, the performance and applicability of ICA, even for a single modality (rsFMRI) analyses, is predicated on a number of assumptions, such as sparsity and independence that are questionable and have been debated (Daubechies et al., 2009; Calhoun et al., 2013). More practically, and importantly, it has been shown that the ICA approach fails in the simplest of idealized simulations (Calhoun et al., 2013; Frank & Galinsky, 2016). These failures motivated the development of the EFD approach, which was demonstrably more accurate than ICA in its application to rsFMRI data (Frank & Galinsky, 2016).

The general idea behind characterizing structure-function relationships is to relate quantitative measures of structural features of a system with the spatio-temporal patterns of parameters changes. For example, in neuroimaging using MRI (neuro-MRI) the goal is to characterize the relationship between brain morphology, neural pathways, and brain activity by combining morphological information from HRA data, structural connectivity from DTI data, and functional connectivity from rsFMRI.

The most common approach to the analysis of neuro-MRI data is to estimate morphology, connectivity, and spatio-temporal variations separately first, then combine them to characterize system "modes". This is, for the most part, simply a practical matter: different methods are used for each analysis and so are applied separately. For example, in studies of structure-function relationships in the human brain Deco et al. (2009, 2011, 2014) uses an empirical structural connectivity (SC) matrix derived from diffusion spectrum imaging (DSI, an extension of DTI) (Wedeen et al., 2005) and tractography (Hagmann et al., 2008) and an empirical functional connectivity (FC) matrix based on Honey et al. (2007, 2009a). Honey et al. (2009a) constructs FC maps based on Pearson correlation between BOLD (Blood Oxygen Level Dependent) time series (a correlation analysis.) The correlation analysis is also used in Dosenbach et al. (2007). Cammoun et al. (2012) uses a similar analysis using DSI at multiple scales, while Zalesky et al. (2014) uses a time-resolved analysis using simple correlation analysis with sliding windows.

However, the great potential of these methods is compromised because of three significant limitations in current state-of-the-art analysis approaches. First, they are, for the most part, not quantitative, and, as a consequence, often are not sufficiently accurate: 1) Quantitation of morphology from HRA is typically limited to surfaces and is highly error prone; 2) Existing DTI analysis methods are incapable of accurately characterizing voxels containing multiple fibers, leading to highly inaccurate estimation of both local anisotropy and global tractography; 3) Resting state rsFMRI analysis methods are essentially ad-hoc and have no well characterized definition of a "brain mode", much less a computational approach amenable to the ranking of modes and the assessment of error estimates. Second, the data from each method are analyzed independently of one another, ignoring the inherent constraints that couple anatomy, connectivity, and function. Third, these methods (DTI and FMRI in particular) are poorly posed inverse problems with a wide range of possible "solutions" to any single estimate, some of which are non-physical. Current analysis methods rarely incorporate constraints that require solutions to be physically realizable.

Additional imaging methods, such as encephalography techniques, e.g., electroencephalography (EEG), and magnetoencephalography (MEG), produce unique and valuable diagnostic data, but are difficult to integrate with other neuroimaging methods such as FMRI due to their different spatial and temporal scales. The measured signal changes in FMRI are related to changes in blood oxygenation, and thus are only indirectly related to neural activity and occur on a very slow time scale ($\approx$1s). EEG and MEG, on the other hand, capture the direct effects of neural activity with exquisite temporal resolution ($\approx$1 ms), but with very poor spatial resolution and can only measure activity in the cortex because electrical/magnetic fields decay rapidly with distance, whereas MRI can detect activity throughout the entire brain with excellent spatial resolution ($\approx$1 mm).

The ability to leverage the strengths of these different acquisition modalities by combining their analysis into a single framework would thus have the potential to produce estimates of structure-function relationships in the brain with greater spatial-temporal resolution than any of these methods taken individually. This potential advantage of multimodal integration of EEG, MEG and neuro-MRI signals is well recognized and has been actively pursued in the last two decades using a range of analysis approaches ranging from simultaneous EEG/MRI acquisition to reconstruction algorithms that model the neuronal generators of EEG/MEG potentials based on FMRI activations obtained under the same task parameters (Sommer et al., 2003; Singh et al., 2002; Vanni et al., 2004). However, current approaches typically rely on a set of restrictive assumptions and combined with numerous conceptual and methodological challenges, the ability to fully combine modalities for the purpose of non-invasive study of human brain structure-function relationships remains an elusive capability.

BRIEF SUMMARY

According to embodiments of the invention, a method is provided for integrating information obtained from data of different modalities into a single framework for spatio-temporal modeling of volumes or areas of interest. The data to be combined can be different imaging modalities or a combination of different imaging modalities, electromagnetic signals or other data types that can be characterized in an image-like format, e.g., scatter plots. The generation of local and joint correlation matrices provides for the integration of diverse data types and extraction of new levels of information that are not achievable from any of those single modalities alone.

In one aspect of the invention, the method for registering multiple data types of diverse modalities for a target volume includes acquiring at least at least two datasets associated with the target volume where the at least two datasets having different modalities. Using information field theory and entropy spectrum pathways theory, a local connectivity matrix is constructed for one or both of spatial connectivity and temporal connectivity for each of the at least two datasets. The local connectivity matrices for the at least two datasets are fused into a common coupling matrix and the datasets are merged to generate a registered image displaying the spatial and temporal features within the target volume.

One important application of the inventive method of joint estimation using space-time entropy regularization (JESTER) provides a solution to a primary goal of many neuroimaging studies that utilize magnetic resonance imaging (MRI): deducing the structure-function relationships in the human brain using data from the three key neuro-MRI modalities: high resolution anatomical, diffusion tensor imaging, and functional MRI. To date, the general procedure for analyzing these data is to combine the results derived independently from each of these modalities.

As applied to neuroimaging, the inventive method provides a new theoretical and computational approach for combining different neuroimaging modalities into powerful and versatile framework that combines recently developed methods for: (a) morphological shape analysis and segmentation, (b) simultaneous local diffusion estimation and global tractography, and (c) non-linear and non-Gaussian spatial-temporal activation pattern classification and ranking, as well as a fast and accurate approach for non-linear registration between modalities. This joint analysis method is capable of extracting new levels of information that are not achievable from any of those single modalities alone. A theoretical probabilistic framework based on a reformulation of prior information and available interdependencies between modalities through a joint coupling matrix and an efficient computational implementation allow construction of quantitative functional, structural and effective brain connectivity modes and parcellation.

The inventive approach, as applied to neuroimaging, provides a general theoretical and computational framework for the analysis of neuro-MRI data based on the reformulation of the problem in terms of the entropy field decomposition (EFD) method (see International Patent Publication No. WO2016/176684), which combines information field theory (IFT) (Enßlin et al., 2009), with prior information encoded on spatial-temporal patterns using entropy spectrum pathways (ESP), disclosed in U.S. Pat. No. 9,645,212. The EFD method is a probabilistic approach that provides a general framework for the integration of HRA, DTI, and FMRI analysis, including results provided by numerical simulations (Baxter & Frank, 2013; Balls & Frank, 2009) to constrain results to those that are physically realistic.

The inventive approach employs recently-developed methods for each of the three modalities, and goes further by adding capability to integrate encephalography data. The first method is spherical wave decomposition (SWD) for shape analysis and segmentation (Galinsky & Frank, 2014), disclosed in International Patent Publication No. WO2015/039054, which is incorporated herein by reference. The second method is the geometrical optics-based ESP method for simultaneous estimation of local diffusion and global tractography (GO-ESP) (Galinsky & Frank, 2015), which is described in U.S. Pat. No. 9,645,212, incorporated herein by reference. The third method is the characterization and estimation of space-time rsFMRI brain activation patterns using EFD (Frank & Galinsky, 2016), described in International Patent Publication No. WO2016/176684, which is incorporated herein by reference. The spatial collocation of these different modalities is provided by using a non-linear registration method based on a general symplectomorphic formulation that constructs flexible grid mapping between modalities regularized by ESP coupling (SYMREG-ESP) (Galinsky & Frank, 2016b), described in International Patent Publication No. WO 2017/132403, which is incorporated herein by reference. The present invention demonstrates how these various analysis methods can be fused together and be mutually informative within the overarching theory of EFD, using a method referred to as "JESTER": Joint ESTimation using Entropy Regularization, allowing construction of more quantitative estimates of brain structural and functional modes.

The EFD formulation is very general, being based on a Bayesian formulation of field theory that facilitated the incorporation of whatever prior information might be available for the problem at hand. The novel feature of the EFD approach is its use of the ESP method to derive the optimal (in the maximum entropy sense) parameter configurations when the space-time coupling structure of the data is used as that prior information. For multi-modality data, the EFD method can be generalized by incorporating the coupling structures not only within the data, but between modalities. Using the inventive approach, we demonstrate this capability using combinations of different neuro-MRI modalities. In a first implementation, HRA, DTI, and rsFMRI are combined. In a second example, the three MRI modalities are incorporated with EEG and MEG to enhance the spatial-temporal localization of brain function and relate it to morphological features and structural connectivity. The results of these implementations demonstrate an increased resolution and specificity of both structural and functional networks in the brain. The inventive analysis approach reveals a scale-free organization of brain structural and functional networks that follow virtually identical power laws.

This new method provides an overall increase of resolution, accuracy, level of detail and information content and has the potential to be instrumental in the clinical adaptation of neuroimaging modalities, which when jointly analyzed provides a more comprehensive view of a subject's structure-function relations. This analysis provides major improvement over conventional methods in which single modalities are analyzed separately, leaving a critical gap in an integrated view of a subject's neurophysiological state.

While the described examples relate to integration of different neuro-imaging modalities, it will be apparent to those in the art that applications of the inventive method are not limited to neuroimaging for clinical diagnosis. Rather, the inventive approach is broadly applicable to quantitative analysis in any field that identifies the flow of information in data over space and time by combining information field theory and entropy spectrum pathways theory, including, but not limited to analysis of radar data in meteorology (see, e.g., International Patent Publication No. WO 2016/176684), or spatio-temporal data that can be represented in the form of an image. An example of such data would be a scatter plot, for example, a distribution of signals transmitted across a network over time, or a distribution of demand within, or attributes of, a network over time, so as to analyze and predict optimal pathways and resource provisioning. To further expand this example, such networks could be wired (including optical) or wireless communications systems, electric power grids, flight paths, and other network-like systems. Other examples of applications will become apparent to those of skill in the art based on the detailed description provided herein.

BRIEF DESCRIPTION OF THE DRAWINGS

FIGS. 3A-3D illustrate a comparison of a set of tracs produced by GO-ESP tractography from a single modality DWI dataset (FIG. 3A) with an equivalent set of tracs obtained when coupling matrix was defined using both DWI and HRA datasets (FIG. 3B). Panels FIGS. 3C and 3D show the close ups for the trac count volumes generated using 5,000,000 total seeds to run GO-ESP tractography, then counting tracs in every voxel and thresholding at 2,000 tracs (i.e., zeroing all voxels with less than 2,000 tracs). The color encoding uses the mean direction of tracs in every voxel. The unified DWI-HRA approach clearly shows additional spatial and angular details as well as new tracs that were absent in DWI-only GO-ESP tractography.

FIGS. 4B and 4D clearly show a significant increase in the level of details allowing resolution of structure and connectivity of white matter bundles not attainable in diffusion datasets alone.

DETAILED DESCRIPTION OF EMBODIMENTS

The EFD method developed for detection and analyses of non-linear and non-Gaussian modes and patterns present in heterogeneous datasets is well suited to the problem of multi-modal connectivity estimation. The cornerstone of EFD estimation procedure is the construction of local connectivity (including spatial connectivity, temporal connectivity, or both) present in the analyzed dataset. The extension of the EFD approach to the joint processing of multi-modal datasets (JESTER) requires a reformulation that combines and fuses these local connectivity patterns into a common coupling matrix. The quantitative EFD procedure can then be applied to this joint intermodality coupling matrix thus allowing the detection and ranking of the connectivity present in those individual datasets, particularly emphasizing datasets with significant intermodal similarities.

Figure 17:
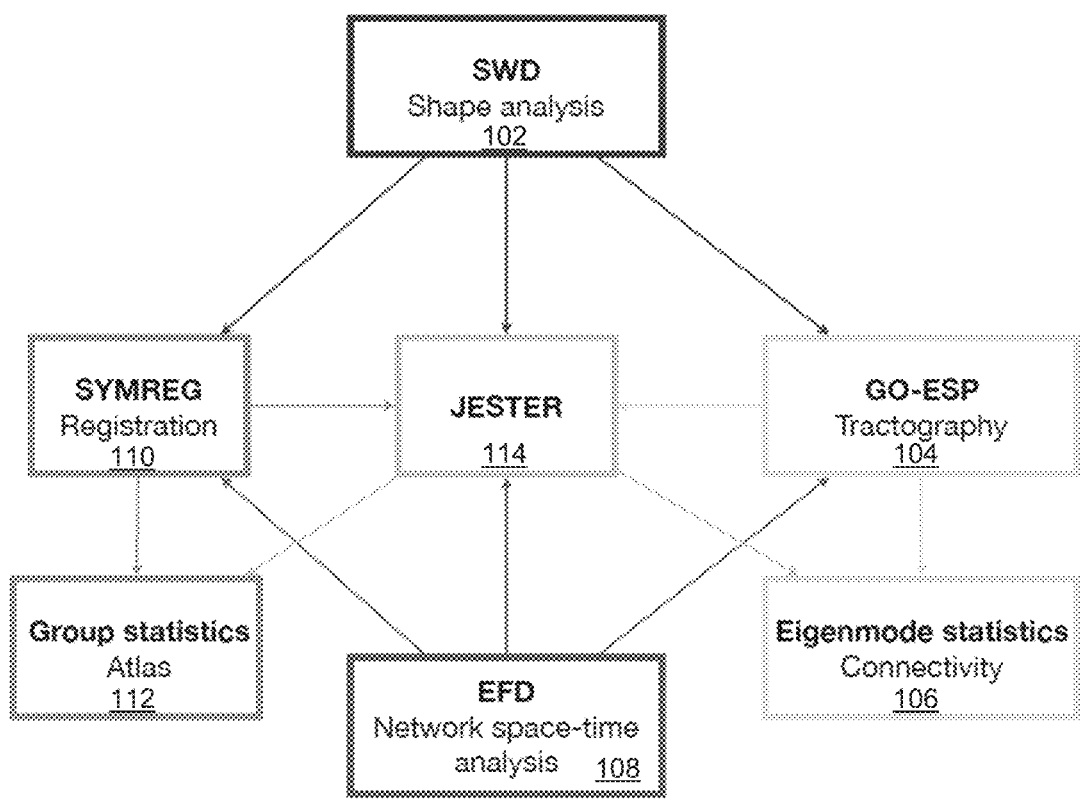
FIG. 17 provides a block diagram illustrating the processing modules employed in embodiments of the inventive method for incorporating different data modalities to characterize structural and functional dependencies present in data.

Referring to FIG. 17, estimation of the connectivity based on multi-modal datasets incorporates shape information ("SWD", block 102) to provide a structural framework of the target region within which other structural and functional elements may be referenced. The target region may be an area (2D) or a volume (3D). In block 104, functional imaging data taken from the target region is used to generate pathways using geometrical optics (GO) and entropy spectrum pathways (ESP). The GO-ESP procedure uses a spin density function to generate a scale-dependent coupling matrix to correlate shape information (from SWD block 102) and functional information to identify equilibrium probabilities. Block 108 ("EFD") takes time series activation data collected within the target region and generates a "coupling matrix" to characterize the relationship between locations in the data to the structure. The frequency-dependent spatial coupling matrix provides the correlation between time-series data and the structural framework to provide mean field volumes.

In block 106, the eigenmode statistics are collected for the various intermode coupling matrices to provide connectivity among the different modes. In Block 110, SYMREG, symplectomorphic registration is used to register the equilibrium probabilities from block 104 and the mean field volumes from block 108 with the structural framework of block 102, providing forward and inverse maps. Further, SYMREG block 110 may also be connected to an atlas (block 112), in which a collection of many images together may be used to create a statistical map of those images (mean shape might be the base atlas, with associated variances attached to regions). Since SYMREG is orders of magnitude faster than existing methods, the SYMREG block can be used for more efficient atlas creation.

In block 114, JESTER is used to identify effective streamlines that characterize both structural and functional dependencies present in the data by combining the correlation function for the functional signal with the structural information from the spin density function, expressing the joint functional-structural dependencies through effective transition probabilities. This is the same procedure that was used to generate pathways in the original GO-ESP method and subsequently used to identify functional pathways using the EFD method, but now extended and generalized to a multi-modal coupling matrix.

In general, the main purpose of data analysis is to estimate unknown quantities s from the data d using available priors I. The data d may include complex spatio-temporal dependencies, e.g., it may be a single value (intensity) recorded for every spatial location (HRA image), a multiple value vector or tensor field data (DTI image), or a time sequence of values (FMRI image). Hence any single point in d is a spatio-temporal point, that is, a location in space-time. From Bayes theorem the posteriori distribution for any of the unknowns can be expressed as $$\underbrace{p(s \mid d, I)}_{Posterior} = \frac{\overbrace{p(d, s \mid I)}^{Joint\ probability}}{\underbrace{p(d \mid I)}_{Evidence}} = \frac{\overbrace{p(d \mid s, I)}^{Likelihood} \overbrace{p(s \mid I)}^{Prior}}{p(d \mid I)} \quad (1a)$$

$$p(d|I) = \int ds\, p(d,s|I) \tag{1b}$$

The IFT (Enßlin et al., 2009) uses the formalism of field theory and expresses the terms in Eqn. 1a using an information Hamiltonian H(d, s) as $$H(d,s) = -\ln p(d,s|I) \qquad \text{Hamiltonian} \tag{2a}$$

$$p(d|I) = \int ds\, e^{H(d,s)} = Z(d) \qquad \text{Partition function} \tag{2b}$$

so that the posterior distribution Eqn. 1a becomes $$p(s|d, I) = \frac{e^{-H(d,s)}}{Z(d)} \tag{3a}$$

The EFD approach introduces a "coupling matrix" that characterizes the relation between locations i and j in the data $Q_{ij} = \exp\{-\gamma_{ij}\}$. The coupling matrix is used to incorporate data dependencies present in the information Hamiltonian H(d,s) in a convenient and concise form appropriate for the analysis of nonlinear and non-Gaussian signals.

Briefly, for background, the following provides the details of the mathematical formulation of EFD:

The information Hamiltonian H(d,s) can be written (Enßlin et al., 2009) as $$H(d,s) = H_0 - j^\dagger s + \tfrac{1}{2} s^\dagger D^{-1} s + H_i(d,s) \tag{4}$$

where $H_0$ is essentially a normalizing constant that can be ignored, D is an information propagator, j is an information source, and † means the complex conjugate transpose. $H_i$ is an interaction term (Enßlin et al., 2009)

$$H_i = \sum_{n=1}^{\infty} \frac{1}{n!} \int \ldots \int \Lambda^{(n)}_{s_1 \ldots s_n} s_1 \ldots s_n ds_1 \ldots ds_n \tag{5}$$

where $\Lambda^{(n)}_{s_1 \ldots s_n}$ terms describe the interaction strength.

When the source term j, the linear information propagator D, and the nonlinear interaction terms $\Lambda^{(n)}_{s_1 \ldots s_n}$ are all known or at least some more or less accurate approximations can be used for their description, the IFT approach provides an effective, powerful, and mathematically elegant way to find an unknown signal s either by using the classical solution at the minimum of Hamiltonian ($\delta H/\delta s = 0$) or with the help of summation methods (e.g., with the help of Feynman diagrams (Feynman, 1949; Enßlin et al., 2009)).

However, there is a whole class of problems where those terms are unknown and too complex for deriving effective and accurate approximations. In this case, the ESP method (Frank & Galinsky, 2014), based on the principal of maximum entropy (Jaynes, 1957a,b), provides a general and effective way to introduce powerful prior information using coupling between different spatio-temporal points that is available from the data itself. This is accomplished by constructing a "coupling matrix" that characterizes the relation between locations i and j in the data $$Q_{ij} = e^{-\gamma_{ij}}. \tag{6}$$

Here, the $\gamma_{ij}$ are Lagrange multipliers that describe the relations and depend on some function of the space-time locations i and j. The eigenvalues $\lambda_k$ and eigenvectors $\varphi^{(k)}$ of the coupling matrix Q $$\sum_j Q_{ij} \phi_j^{(k)} = \lambda_k \phi_i^{(k)}, \tag{7}$$

then formally define the transition probability from location j to location i of the k'th mode (or "path" as it is often called in the random walk theory) as $$p_{ijk} = \frac{Q_{ji}}{\lambda_k} \frac{\phi_i^{(k)}}{\phi_j^{(k)}} \tag{8}$$

For each transition matrix Eqn. 8 there is a unique stationary distribution associated with each mode k:

$$\mu^{(k)} = [\phi^{(k)}]^2 \tag{9}$$

that satisfies $$\mu_i^{(k)} = \sum_j \mu_j^{(k)} p_{ijk} \tag{10}$$

where $\mu^{(1)}$, associated with the largest eigenvalue $\lambda_1$, corresponds to the maximum entropy stationary distribution (Burda et al., 2009).

The EFD approach (Frank & Galinsky, 2016a,b) adds these coupling matrix priors into the information Hamiltonian Eqn. 4 by expanding the signal s into a Fourier expansion using $\{\varphi^{(k)}\}$ as the basis functions $$s_i = \sum_k^K [a_k \phi_i^{(k)} + a_k^\dagger \phi_i^{\dagger,(k)}]. \tag{11}$$

In this ESP basis the information Hamiltonian Eqn. 4 can be written as $$H(d, a_k) = -j_k^\dagger a_k + \tfrac{1}{2} a_k^\dagger \Lambda a_k + \sum_{n=1}^{\infty} \frac{1}{n!} \sum_{k_1}^{K} \ldots \sum_{k_n}^{K} \tilde{\Lambda}^{(n)}_{k_1 \ldots k_n} a_{k_1} \ldots a_{k_n}, \tag{12}$$

where matrix $\Lambda$ is the diagonal matrix Diag$\{\lambda_1, \ldots, \lambda_K\}$, composed of the eigenvalues of the coupling matrix, and $j_k$ is the amplitude of kth mode in the expansion of the source j $$j_k = \int j \varphi^{(k)} ds \tag{13}$$

and the new interaction terms $\tilde{\Lambda}^{(n)}$ are $$\tilde{\Lambda}^{(n)}_{k_1 \ldots k_n} = \int \ldots \int \Lambda^{(n)}_{s_1 \ldots s_n} \varphi^{(k_1)} \ldots \varphi^{(k_n)} ds_1 \ldots ds_n \tag{14}$$

For the nonlinear interaction terms $\Lambda^{(n)}_{s_1 \ldots s_n}$, the EFD method again takes coupling into account through factorization of $\Lambda^{(n)}$ in powers of the coupling matrix $$\Lambda^{(n)}_{s_1 \ldots s_n} = \frac{\alpha^{(n)}}{n} \sum_{p=1}^{n} \prod_{\substack{m=1 \\ m \neq p}}^{n} Q_{pm}, \tag{15}$$

where $\alpha^{(n)} \le 1/\max(j_k{}^n/\lambda_k)$, which results in $$\tilde{\Lambda}_{k_1\ldots k_n}^{(n)} = \frac{\alpha^{(n)}}{n}\sum_{p=1}^{n}\left(\frac{1}{\lambda_{k_p}}\prod_{m=1}^{n}\lambda_{k_m}\right)\int\left(\prod_{r=1}^{n}\phi^{k_r}\right)ds. \quad (16)$$

Thus, the EFD approach provides a very simple expression for the classical solution for the amplitudes $a_k$ $$\Lambda a_k = \left(j_k - \sum_{n=1}^{\infty}\frac{1}{n!}\sum_{k_1}^{K}\ldots\sum_{k_n}^{K}\tilde{\Lambda}_{kk_1\ldots k_n}^{(n+1)}a_{k_1}\ldots a_{k_n}\right) \quad (17)$$

through the eigenvalues and eigenvectors of coupling matrix (that may also include some noise corrections).

Constructing either linear or nonlinear solutions for the unknown signal s requires an explicit generation of either the coupling matrix Q itself or the coupling coefficients γ. Using single modality datasets as a source of coupling allows the generation of powerful and effective single modality data analysis approaches, i.e., the coupling matrix obtained from the diffusion-weighted imaging data produced an accurate and effective way for simultaneous estimation of local diffusion and global tractography with the geometrical optics-based GO-ESP method. Similarly, the coupling matrix based on the correlation properties of time series from rsFMRI datasets resulted in accurate and effective characterization and estimation of space-time rsFMRI brain activation patterns.

However, the generality of the EFD formalism provides a natural mechanism for even more complex and comprehensive analysis by incorporating data from different modalities into the coupling matrix. Assuming that instead of a single dataset d, we now have m=1, ..., M different modalities $d^{(m)}$ with the coupling matrices $Q^{(m)}$ that all correspond to the same unknown signal s, we can then construct an intermodality coupling matrix as the product of these coupling matrices for the individual modalities expressed in the ESP basis and registered to a common reference frame, which we denote $\tilde{Q}^{(m)}$: That is, the joint coupling matrix is $\mathcal{Q}^{(m)}=\Pi_m \tilde{Q}^{(m)}$. More specifically, the joint coupling matrix $\mathcal{Q}_{ij}$ between any two space-time locations (i, j) can be written in the general (equivalent) form as $$\ln\mathcal{Q}_{ij} = \sum_{m=1}^{M}\beta_{ij}^{(m)}\ln\tilde{Q}_{ij}^{(m)} \quad (18)$$

where the exponents $\beta^{(m)}$ can either be some constants or functions of data collected for different modalities $$\beta_{ij}^{(m)}=\beta^{(m)}(\tilde{d}_i,\tilde{d}_j,\tilde{d}_i=\{\tilde{d}_i^{(1)},\ldots,\tilde{d}_i^{(M)}\}, \quad (19)$$

where $\tilde{d}_i^{(m)}$ and $\tilde{Q}_{ij}^{(m)}$ represent, respectively, the data and the coupling matrix of the modality dataset m represented in the ESP basis and evaluated at locations $r_i$ and $r_j$ of a common reference domain R:

$$\tilde{d}_i^{(m)}=d^{(m)}(\psi^{(m)}(r_i)), \tilde{Q}_{ij}^{(m)}=Q^{(m)}(\psi^{(m)}(r_i),\psi^{(m)}(r_j)), \quad (20)$$

where $\psi^{(m)}$: R→X⁻ denotes a diffeomorphic mapping of $m^{th}$ modality from the reference domain R to an acquisition space X.

This construction of the intermodality coupling involves several simple assumptions. Two neighboring voxels i and j are considered to be highly coupled if: a) their structural image intensities are similar; b) their diffusion-weighted spin density functions (Eqn. 8 in (Galinsky & Frank, 2015)) point to each other; and c) their resting state FMRI signals are maximally correlated across all frequencies.

The mathematical details that incorporate and formalize these assumptions into coupling matrix expressions are provided by Eqns. 21 through 30:

For the HRA dataset, we define a simple intensity weighted nearest neighbors coupling matrix as $$Q_{ij}^H = e^{-\gamma ij} = \begin{cases} d_i^H d_j^H & \text{nearest neighbors} \\ 0 & \text{not connected} \end{cases}. \quad (21)$$

For DWI data, the GO-ESP procedure uses the spin density function G(r,R) expressed with the help of the spherical wave decomposition as $$G(r, R) = 4\pi\sum_{l=0}^{\infty}\sum_{m=-l}^{l}i^l Y_l^m(\hat{R})g_{lm}(r, R), \quad (22)$$

$$g_{lm}(r, R) = \int W(r, q)j_l(qR)Y_l^{m*}(\hat{q})dq \quad (23)$$

and generate the symmetrized scale dependent coupling matrix $Q_{ij}^D$ as $$Q_{ij}^D(l)=Q_{ji}^D(l)=\frac{1}{2}\lfloor G(r_j,(r_i-r_j)l)+G(r_j,(r_j-r_i)l)\rfloor \quad (24)$$

where l represents the dimensionless ratio of scales of dynamic displacement R to the spatial (voxel) scales r, ji(qR) is the spherical Bessel function of order l and $Y_l^m(\hat{q})=Y_l^m(\Omega_{\hat{q}})=Y_l^m(\theta_q,\phi_q)$ is the spherical harmonic with $\theta_q$ and $\phi_q$ being the polar and azimuthal angles of the vector q, and similarly for the vector R, and W (r, q) is the DWI signal (see Galinsky & Frank (2015) for more details).

For rsFMRI, the EFD procedure employs the frequency ω dependent spatial coupling matrix $Q_{ij}^F(\omega)$ as $$Q_{ij}^F(\omega_0)=\mathcal{R}_{ij}{}^n d_i^F(\omega_0)d_j^F(\omega_0), \quad (25)$$

$$Q_{ij}^F(\omega_t)=\mathcal{R}_{ij}{}^n(\phi_i^{(1)}(\omega_0)d_j^F(\omega_t)+\phi_j^{(1)}(\omega_0)d_i^F(\omega_t)), \quad (26)$$

where $d_i^F(\omega)$ is the temporal Fourier mode of the rsFMRI data $d^F$ with the frequency ω, $\phi_i^{(l)}(\omega_0)$ is the eigenvector of $Q^F(\omega_0)$ that corresponds to the largest eigenvalue, and $\mathcal{R}_{ij}$ can include some function of the pair correlations taken to the nth power, for example, a simple mean of the pair correlations, that is equivalent to a product of signal means ($\overline{d^F}$) for a periodic signal $$\mathcal{R}_{ij} = \frac{1}{T}\int_0^T C_{ij}(t)dt \equiv T\overline{d_i^F}\,\overline{d_j^F} \quad (27)$$

or a maximum correlation of mean subtracted signal $$\mathcal{R}_{ij} = \max_{0\le t\le T}|C_{ij}(t) - T\overline{d_i^F}\,\overline{d_j^F}|, \quad (28)$$

where $C_{ij}(t)$ is the pair correlation $$C_{ij}(t)=\int d_i^F(t-\tau)d_j^F(\tau)d\tau \quad (29)$$

The EFD procedure can then be extended to incorporate information from all of the modalities simultaneously by incorporating these single modality coupling matrices $Q_{ij}^H$, $Q_{ij}^D$ and $Q_{ij}^F$ in Eqn. 18 to generate the intermodality coupling matrix $\mathcal{Q}_{ij}$.

To investigate the long range structural, functional, and effective connection patterns that span both gray and white matter regions, we generate the connectivity matrix using structural, functional, and effective streamlines produced by GO-ESP tractography. For structural tractography, we employ the nearest neighbor connectivity matrix generated from DWI and HRA datasets and follow the same formalism that was used for single modality DWI tractography.

For functional tractography, the same notion of entropy change was used as in Galinsky & Frank (2015):

$$S_i = -\sum_k \mu^{(k)} \sum_j p_{ijk} \ln p_{ijk} \tag{30}$$

assuming that both the equilibrium $\mu$ and transitional probabilities $p_{ij}$ were obtained from the functional nearest neighbor coupling matrix $Q_{ij}^F(\omega_0)$ using Eqn. 9 and Eqn. 8. This global entropy field was obtained under the Markovian assumption in the limit of long pathway lengths (or large times) (Shannon, 1948; McMillan, 1953) and describes the global flow of information. The same formalism of linearizing the Fokker-Planck equation with a potential in the form of the global entropy (Eqn. 30) and finding the characteristic solution using the Hamiltonian set of equations as was used by Galinsky & Frank (2015) for DWI tractography produces GO-ESP functional tracking. The streamline angular distribution is shaped in this case by the correlation function of the function signal.

The intermodality coupling matrix $\mathcal{Q}_{ij}$ facilitates the development of a unified description of brain connectivity that includes both the structural dependencies (derived from long range DWI connectivity and HRA morphology) and the functional correlations (based on activation modes buried within the functional MRI data).

One particularly informative way in which the intermodality coupling matrix $\mathcal{Q}_{ij}$ can be used is to generate the effective streamlines that characterize both structural and functional dependencies present in the data by combining the correlation function for the functional signal with the structural information from the spin density function, expressing the joint functional-structural dependencies through effective transition probabilities (Eqn. 8). This is the same procedure that was used to generate fiber tracts from DTI data in the original GO-ESP method and subsequently used to perform functional tractography using the EFD method, but now extended and generalized to a multi-modal coupling matrix. The resulting streamlines therefore represent high-probability pathways in the joint structural-functional space.

A set $L=\{l^{(n)}\}$, $n=1 \ldots N$ of effective multi-modality streamlines can be used to generate a new coupling matrix that includes connections between distant voxels. Assuming that each streamline $l^{(n)}$ is a vector such that $$l_i^{(n)} = \begin{cases} 1 & \text{voxel } i \text{ belongs to the streamline } l^{(n)} \\ 0 & \text{voxel } i \text{ does not belongs to the streamline } l^{(n)} \end{cases} \tag{31}$$

we can define the "eigenmode coupling matrix":

$$Q^e = \sum_{n=1}^{N} l^{(n)T} l^{(n)} - N\mathbb{I}. \tag{32}$$

Finding the eigenvalues and eigenvectors of the $Q^e$ matrix generates ranked connectivity eigenmodes that provides the coupling between modalities.

The following examples provide illustrative applications of the inventive multi-modal joint estimation (JESTER: Joint ESTimation using Entropy Regularization) scheme described above. Based on the foregoing description and the examples below, it will become apparent to those of skill in that art that the inventive method provides a valuable tool for performing quantitative analysis of imaging data of nearly any type, applications of which include, but are not limited to, medical imaging for clinical diagnosis and analysis of radar data in meteorology.

Example 1: Neuro-MRI Data Analysis

Figure 1:
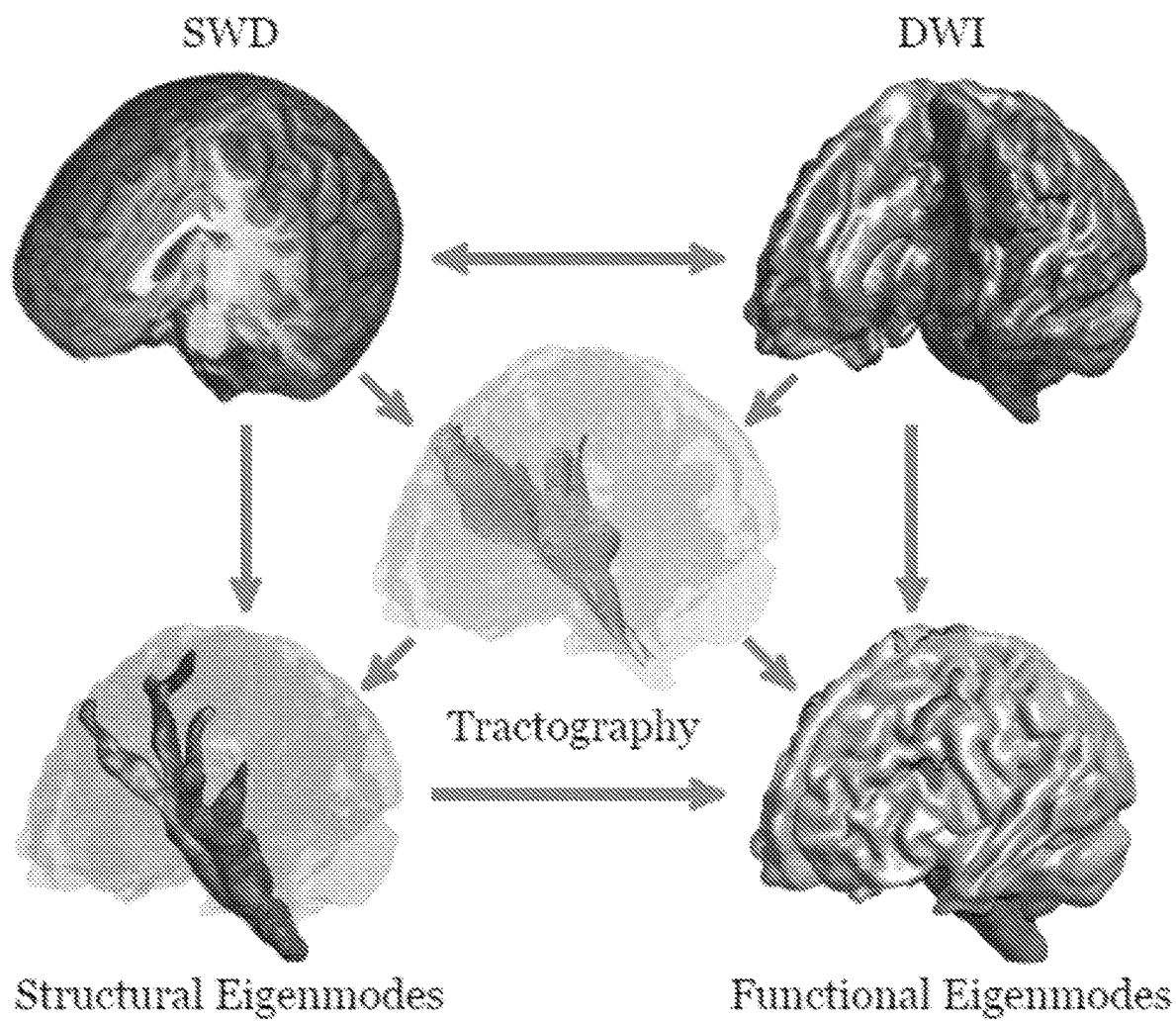
FIG. 1 illustrates working demonstration example of joint estimation workflow showing extraction of a single structural eigen mode and a single functional eigen mode using HRA, DWI and FMRI HCP datasets.

The first example applies the inventive approach to a typical single subject neuro-MRI study with HRA, DWI, and rsFMRI datasets acquired. This is but one specific instantiation of the JESTER method as additional modalities can be easily added into the processing. All elements of the processing were coded in standard C/C++ and parallelized using POSIX threads. FIG. 1 provides a working demonstration example of joint estimation workflow showing extraction of a single structural eigen mode and a single functional eigen mode using HRA, DWI and FMRI HCP datasets. This workflow scheme can be described as follows: The processing workflow starts with HRA dataset. First it extracts the brain, doing skull stripping, and then generates the SWD (upper left corner of FIG. 1) for the brain volume to be used in volume segmentation and registration later.

For the DWI dataset (upper right), the GO-ESP procedure is used that generate a new data volume of the equilibrium probabilities (EP) data.

For the rsFMRI dataset the EFD procedure is used to generate a new data volume of the mean field data (that is a volume that contains averages of all activations), removing both temporal and spatial outliers.

The DWI equilibrium probabilities and the rsFMRI mean field volumes are then registered with the HRA brain volume using the symplectomorphic registration SYM-REG-ESP providing forward and inverse maps.

The symplectomorphic maps together with the HRA SWD volume are then included into GO-ESP global tractography to generate high resolution, very high density fiber tracts with a possibility of more than twofold improvement of the DWI spatial resolution and potentially resolving crossing fibers at below 10° angular resolution reported in Galinsky & Frank (2016a).

The high resolution very high density fiber tracts distribution is used to generate ESP long range structural connectivity eigenmodes.

The symplectomorphic maps together with the HRA SWD volume and the processing, providing a greater improvement in resolved details of rsFMRI activation modes than is possible without the information provided by the other modalities by generating high resolution effective connectivity eigenmodes. A fusion of structural and functional coupling provides an important advantage of those high resolution effective connectivity eigenmodes over single modality FMRI activation modes—the effective eigenmodes include both WM and GM regions in a way consistent with both structural and functional dependencies.

Additional modalities can easily be incorporated into this workflow.

To test our approach, we used one of the publicly accessible datasets available from the open source Human Connectome Project (Van Essen et al., 2013, 2012; Sotiropoulos et al., 2013), as well as several diffusion imaging datasets collected locally at the UCSD Center for Functional MRI (CFMRI).

The HCP dataset was collected on the customized Siemens 3T CONNECTOM™ scanner, which is a modified 3T SKYRA™ system (MAGNETOM™ SKYRA™ Siemens Healthcare), housed at the MGH/HST Athinoula A. Martinos Center for Biomedical Imaging (see Setsompop et al. (2013) for details of the scanner design and implementation). A 64-channel, tight-fitting brain array coil (Keil et al., 2013) was used for data acquisition. The dataset contains 96 slices of 140×140 matrix (1.5 mm linear voxel size) at four levels of diffusion sensitizations (b-values b=1 k, 3 k, 5 k and 10 k s/mm$^2$) distributed over 552 total q-vectors.

The CFMRI data were acquired with a 3T GE Discovery™ MR750 whole body MRI system. The anatomical T1 volumes have 168×256×256 voxel size with 1.2×0.9375×0.9375 mm$^3$ resolution.

A multiband DTI EPI acquisition (Setsompop et al., 2011) developed at the CFMRI employed three simultaneous slice excitations to acquire data with three diffusion sensitizations (at b-values b=1000/2000/3000 s/mm2) for 30, 45 and 65 different diffusion gradients (respectively) uniformly distributed over a unit sphere. Several baseline (b=0) images were also recorded. The data were reconstructed offline using the CFMRI's multiband reconstruction routines. The DWI datasets have 100×100×72 matrix size with 2×2×2 mm3 resolution. Whole brain BOLD (Blood Oxygen Level Dependent) resting-state data were acquired over thirty axial slices using an echo planar imaging (EPI) sequence (flip angle=70°, slice thickness=4 mm, slice gap=1 mm, FOV=24 cm, TE=30 ms, TR=1.8 s, matrix size=64×64×30). Further details are available in Wong et al. (2013). All data were pre-processed using the standard pre-processing analysis pathway at the CFMRI (as described in Wong et al. (2013)). Nuisance terms were removed from the resting-state BOLD time series through multiple linear regression. These nuisance regressors included: i) linear and quadratic trends; ii) six motion parameters estimated during image co-registration and their first derivatives; iii) RETROICOR (2nd order Fourier series) (Glover et al., 2000) and RVHRCOR (Chang & Glover, 2009) physiological noise terms calculated from the cardiac and respiratory signals; and iv) the mean BOLD signals calculated from white matter and CSF regions and their first respective derivatives, where these regions were defined using partial volume thresholds of 0.99 for each tissue type and morphological erosion of two voxels in each direction to minimize partial voluming with gray matter.

Figure 2A:
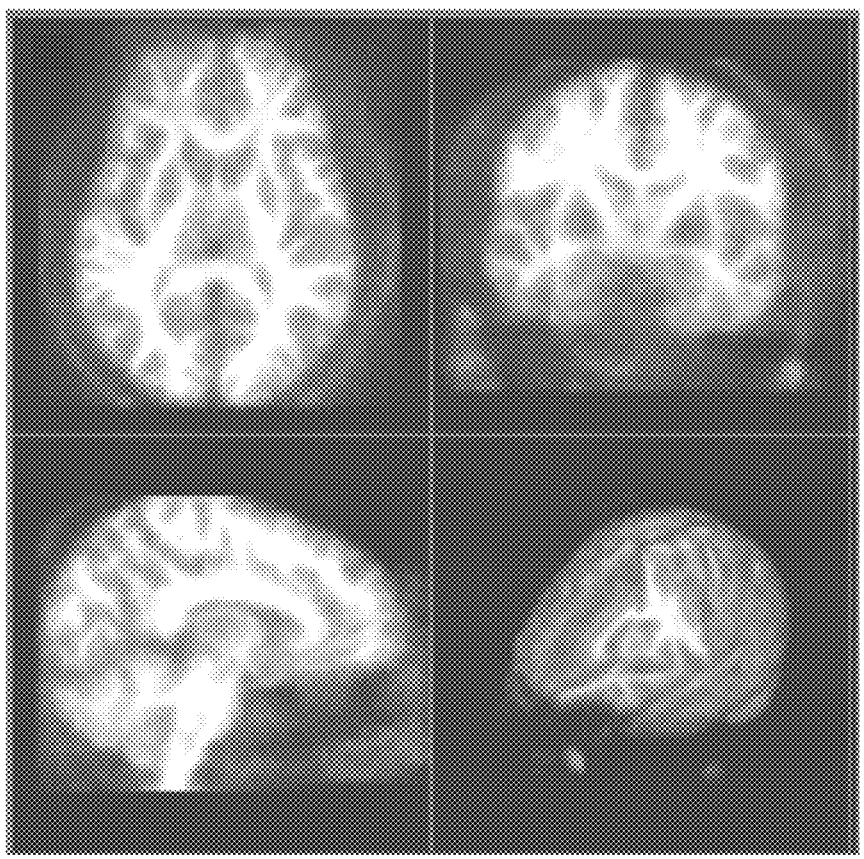
FIGS. 2A-2D provide a comparison of equilibrium probability maps obtained from a single modality DWI dataset (FIG. 2A) with equilibrium probability maps extracted using coupling matrix based on both DWI and HRA datasets (FIG. 2B). A significant enhancement of white matter localization as well as significant overall image quality improvement due to signal-to-noise ratio increase can clearly be seen in all panels of FIG. 2B. Close-up panels (FIG. 2C) and (FIG. 2D) of the lower left quadrant of the axial images in (FIG. 2A) and (FIG. 2B), respectively, make the enhancements easier to visualize.
Figure 2B:
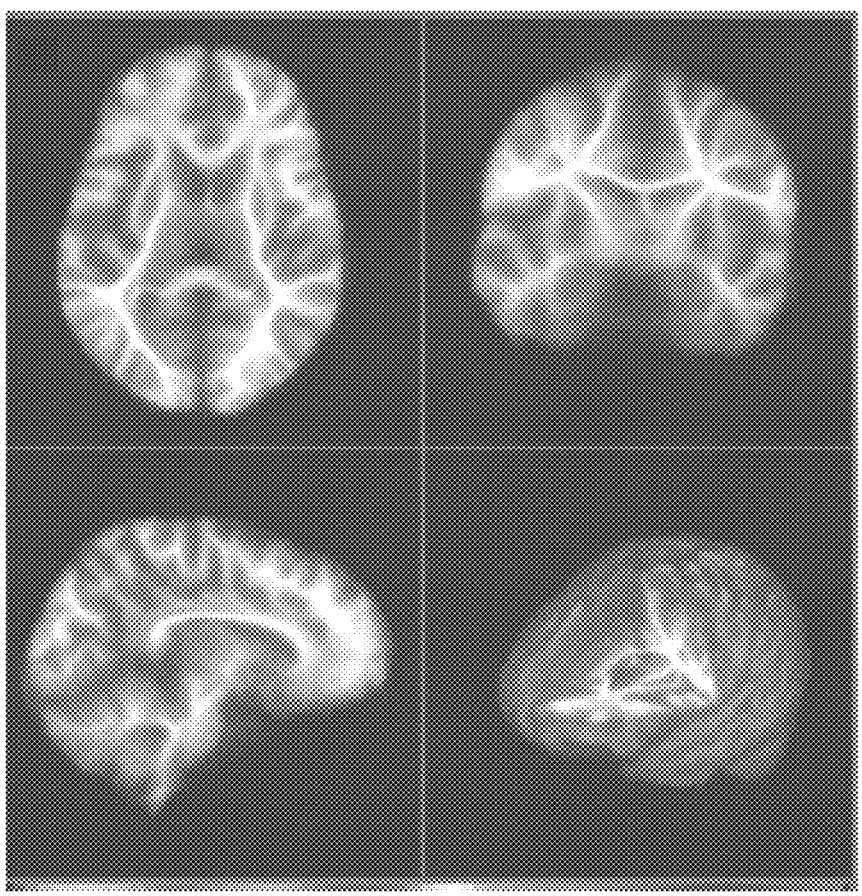
Figure 2C:
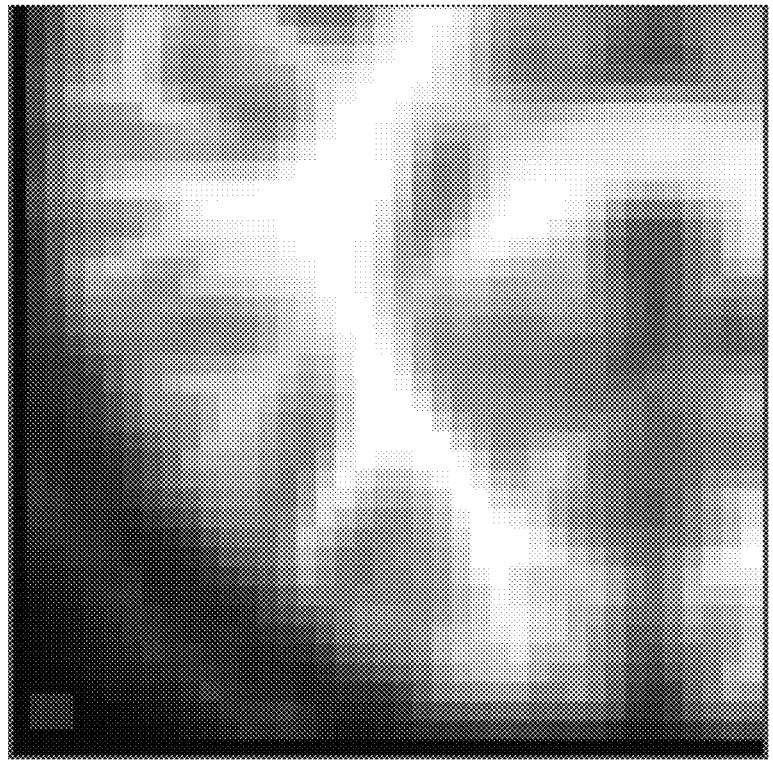
Figure 2D:
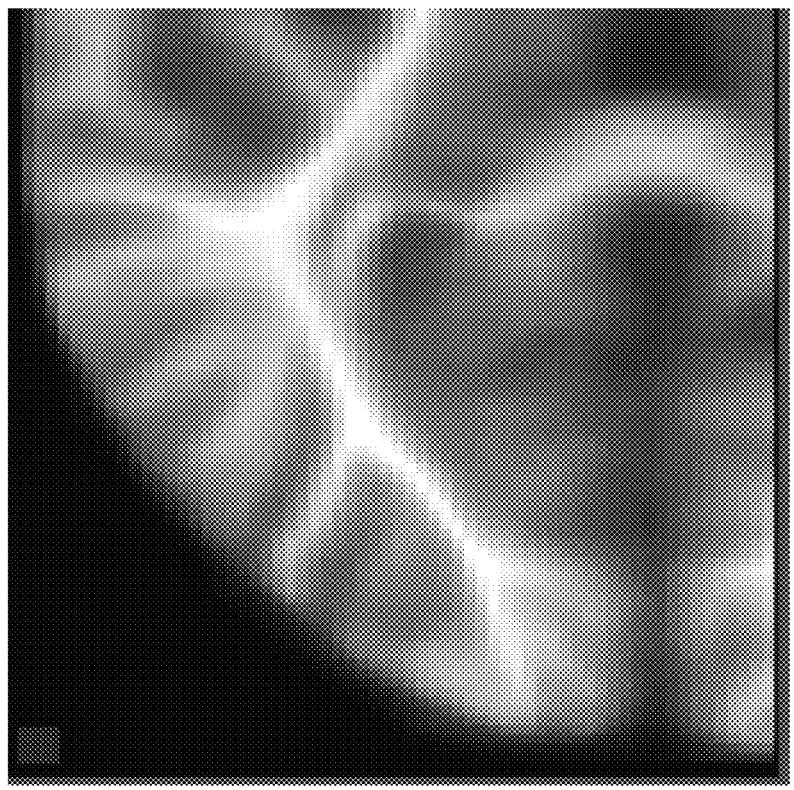

The data for every subject with T1 HRA, DWI and rsFMRI datasets was analyzed twice, first using independent processing of each modality, and then using the joint modality approach developed in this paper. The addition of HRA coupling into the diffusion estimation and tractography process not only provides a significant boost to the overall level of detail that can be captured but, more importantly, shows features that are not apparent when the modalities are analyzed independently. FIGS. 2A and 2B show details of the equilibrium probability map obtained from a single modality DWI dataset using several different views in FIG. 2A and compares them with the same views of the map produced from the joint HRA+DWI coupling matrix in FIG. 2B. The jointly estimated maps of FIG. 2B clearly show improvements in image quality—the two-fold increase in linear image resolution provides more small scale detail and greater noise suppression. FIGS. 2C and 2D are enlargements of the lower left corner of the axial views of FIGS. 2A and 2B, respectively. The localization of white matter fiber bundles is clearly enhanced significantly in the jointly estimated maps shown in FIGS. 2B and 2D.

These joint estimation improvements can also be seen in tractography results, shown in FIGS. 3A-3D, which illustrate a comparison of a set of tracs produced by GO-ESP tractography from a single modality DWI dataset (FIG. 3A) with an equivalent set of tracs obtained when coupling matrix was defined using both DWI and HRA datasets (FIG. 3B). Panels FIGS. 3C and 3D show the close ups for the trac count volumes generated using 5,000,000 total seeds to run GO-ESP tractography, then counting tracs in every voxel and thresholding at 2,000 tracs (i.e., zeroing all voxels with less than 2,000 tracs). The color encoding uses the mean direction of tracs in every voxel. The unified DWI-HRA approach clearly shows additional spatial and angular details as well as new tracs that were absent in DWI-only GO-ESP tractography. The unified DWI-HRA estimation procedure is again able to detect additional details in overall fiber tract distribution compared to the DWI procedure performed independently as well as providing increased resolution of the tracts.

Figures 4A, 4B:
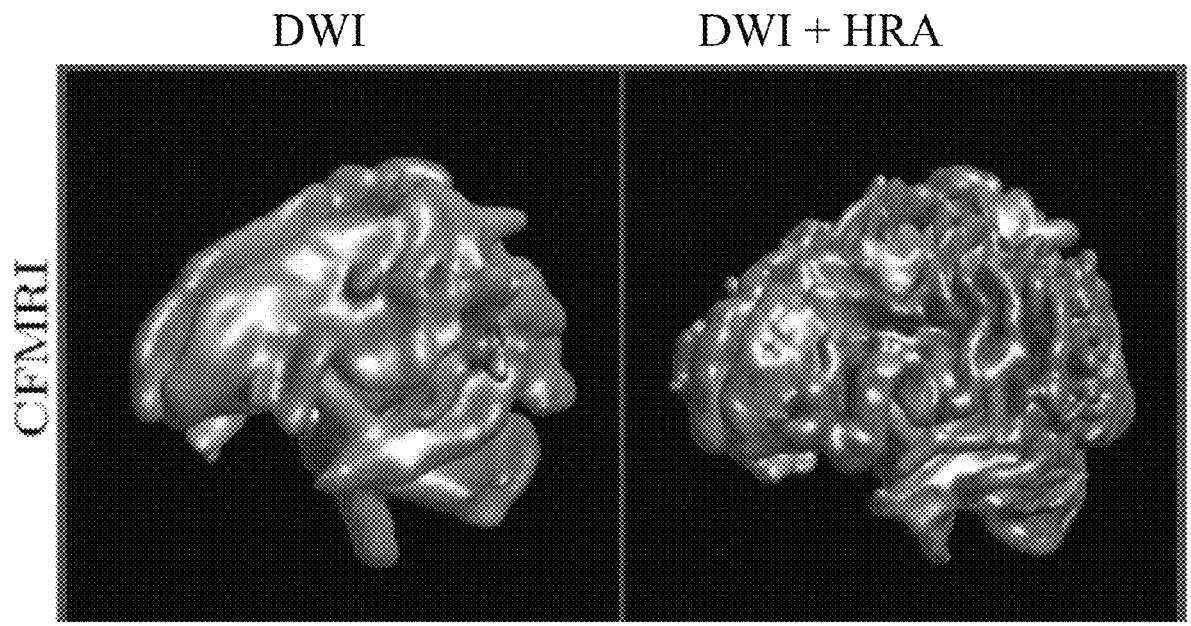
FIGS. 4A-4D illustrate shapes of trac counts in every voxel generated by a whole brain GO-ESP tractography using only DWI datasets (FIGS. 4A and 4C) and both DWI and HRA datasets (FIGS. 4B and 4D). CFMRI data acquired an a 3T GE Signa scanner with diffusion data of matrix size (x, y, z)=(100, 100, 72) and isotropic resolution of 8 mm$^3$ and T1-weighted anatomical images with matrix size (x, y, z)=(168, 256, 256) and resolution of 1.2×0.9375×0.9375 mm$^3$ were used in FIGS. 4A and 4B, and HCP datasets acquired on a Siemens 3T system (the special connectome scanner at MGH) with diffusion data matrix of size (x, y, z)=(140, 140, 96) and isotropic spatial resolution of 3.375 mm$^3$ and T1-weighted anatomical images with matrix size (x, y, z)=(176, 256, 176) and 1 mm$^3$ isotropic resolution were used in FIGS. 4C and 4D. The volumes were generated from tractography generated from 5,000,000 seeds then counting tracs in every voxel and thresholding at 1,000 tracs (that is zeroing all voxels with less than 1,000 tracs). For coloring scheme, the mean direction of tracs in every voxel is used.
Figures 4C, 4D:
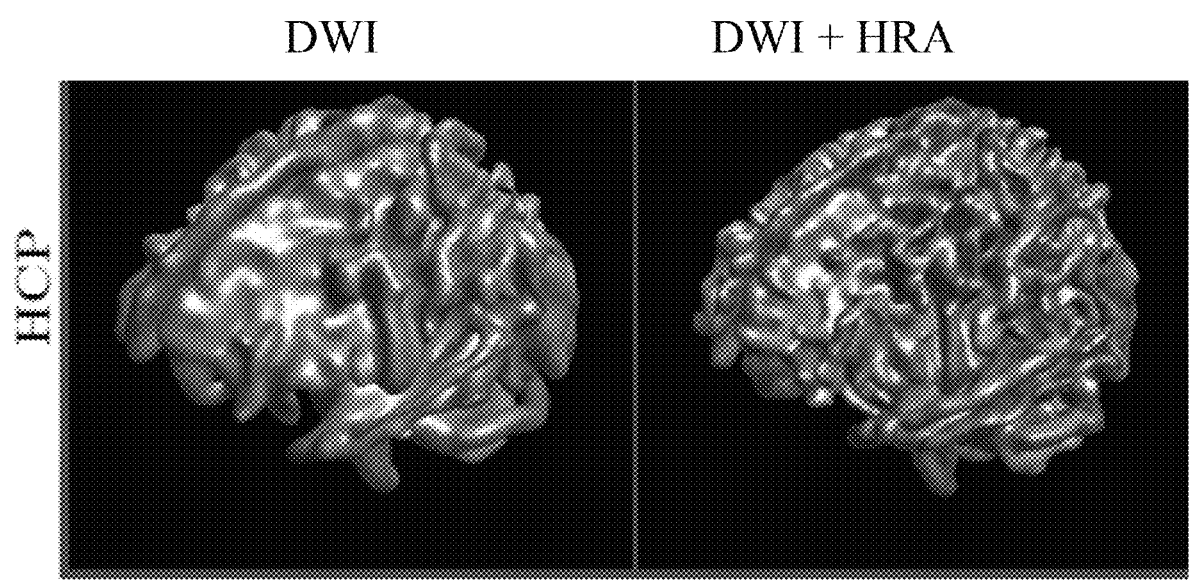

This improvement is even more pronounced if one constructs a volume generated from the trac counts in every voxel produced by GO-ESP whole brain tractography, as shown in FIGS. 4A-4D. FIGS. 4A-4D illustrate shapes of trac counts in every voxel generated by a whole brain GO-ESP tractography using only DWI datasets (FIGS. 4A and 4C) and both DWI and HRA datasets (FIGS. 4B and 4D). CFMRI data acquired an a 3T GE Signa scanner with diffusion data of matrix size (x, y, z)=(100, 100, 72) and isotropic resolution of 8 mm$^3$ and T1-weighted anatomical images with matrix size (x, y, z)=(168, 256, 256) and resolution of 1.2×0.9375×0.9375 mm$^3$ were used in FIGS. 4A and 4B, and HCP datasets acquired on a Siemens 3T system (the special connectome scanner at MGH) with diffusion data matrix of size (x, y, z)=(140, 140, 96) and isotropic spatial resolution of 3.375 mm$^3$ and T1-weighted anatomical images with matrix size (x, y, z)=(176, 256, 176) and 1 mm$^3$ isotropic resolution were used in FIGS. 4C and 4D. The volumes for both the HCP and CFMRI sets of tracs were generated from tractography generated from 5,000,000 seeds then counting tracs in every voxel and thresholding at 1,000 tracs (that is, zeroing all voxels with less than 1,000 tracs). For coloring scheme, the mean direction of tracs in every voxel is used. FIGS. 4B and 4D, illustrating the joint DWI+HRA processing, clearly show a significant increase in the level of details allowing resolution of structure and connectivity of white matter bundles not attainable in diffusion datasets alone, thus significantly increasing the directional information available from diffusion data.

Using joint connectivity matrices allows us to generate eigenmodes that can be instrumental in finding and understanding the most important structural and functional dependency patterns present in the underlying data. This facilitates uncovering and quantitatively characterizing an effective information exchange that happens on different scales of the brain and modulates the overall brain performance.

Figure 5:
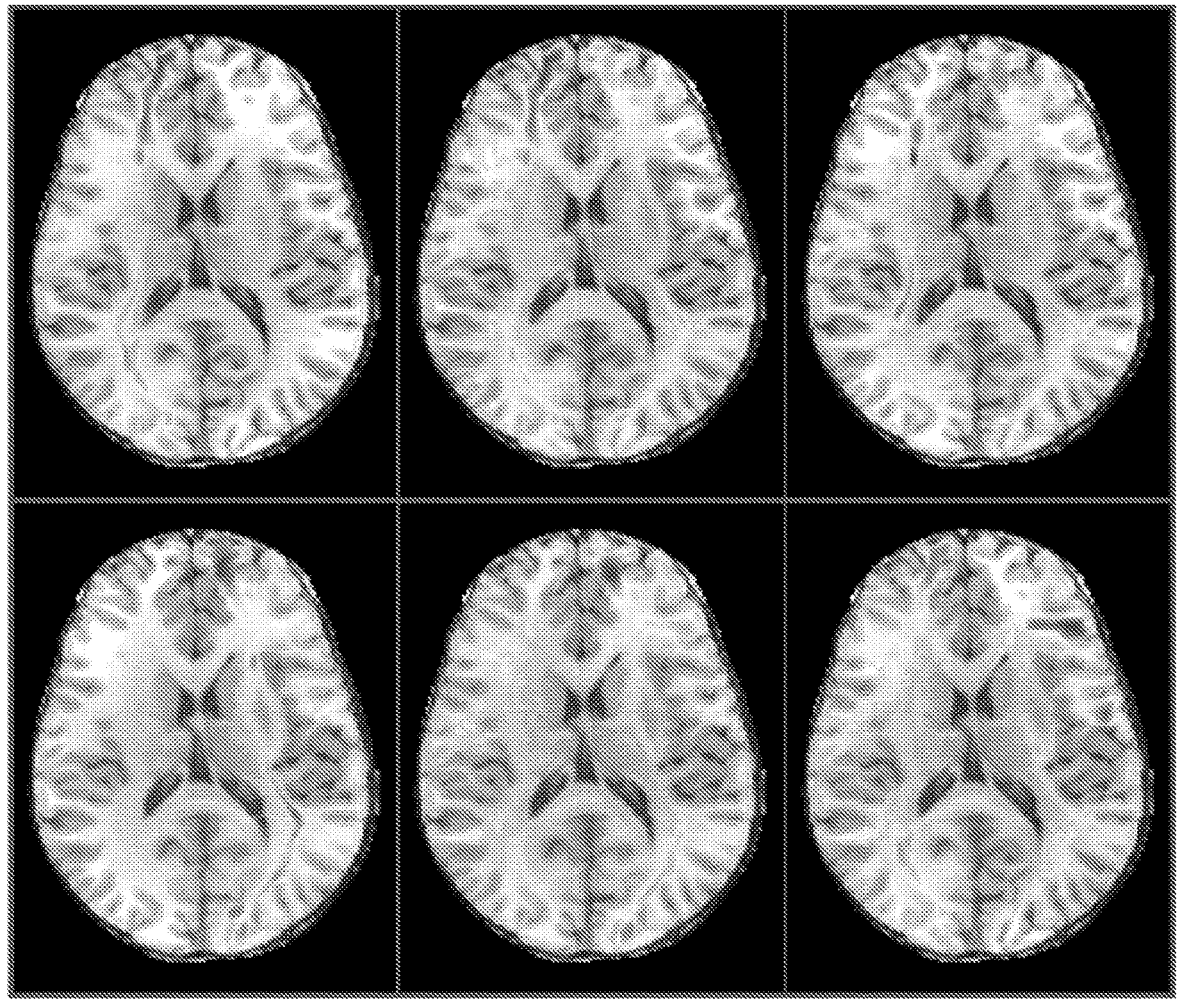
FIG. 5 shows several structural eigenmodes of DWI-HRA connectivity matrix. Each eigenmode outlines an interconnected region where a random walker will spend most of the time (property quantitatively described by shown equilibrium probability map). Those modes are only loosely connected with other regions, i.e., each eigenmode defines a different connectivity pattern ranked according to mode power (shown in FIG. 7).

FIG. 5 shows several structural connectivity eigenmodes of DWI-HRA connectivity matrix that were produced by running DWI+HRA GO-ESP tractography and using streamlines to generate the eigenmode (or streamline) coupling matrix that includes connections between distant voxels (Eqn. 8). Each eigenmode outlines an interconnected region where a random walker will spend most of the time (property quantitatively described by shown equilibrium probability map). Those modes are only loosely connected with other regions, i.e., each eigenmode defines a different connectivity pattern ranked according to mode power (shown in FIG. 7). Because the streamline coupling matrix contains the number of connections between every pair of voxels located both inside the white or gray matter of the brain and on the cortical surface, it provides volumetric probability weighted connectivity that is significantly more informative than binary on-off connectivity typically generated for cortical regions. Furthermore, because the seeding for GO-ESP tractography uses equilibrium and transitional probabilities to sample spatial and angular distributions of tracs, it ensures the consistency with both the diffusion and anatomical data volumes that were acquired. The eigenmodes of the streamline coupling matrix can be viewed as interconnected regions of a brain that are only loosely connected with other regions. The structure of these eigenmodes includes multiple modality constraints, hence, can provide a more comprehensive description and ranking of the connectivity patterns reflecting the input from multiple modalities.

Figure 6A:
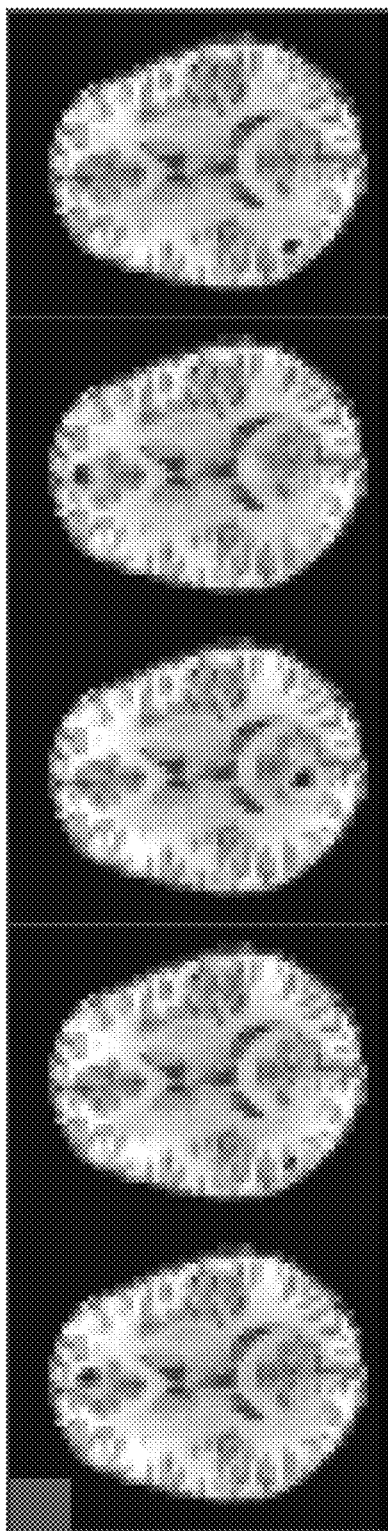
FIGS. 6A-6C illustrate several nonlinear EFD eigenmodes that were obtained using a single modality rsFMRI dataset FIG. 6A), using joint rsFMRI-HRA connectivity matrix (FIG. 6B), and using both functional (rsFMRI) and structural (DWI+HRA) connectivity matrices—effective connectivity eigenmodes, shown in FIG. 6C. Both the original rsFMRI EFD modes in FIG. 6A and the rsFMRI-HRA EFD modes in FIG. 6B clearly show the BOLD activation patterns with improved localization of modes in the areas of gray matter and refined details appearing in FIG. 6B. The effective connectivity eigenmodes in FIG. 6C show the additional connectivity through white matter tracs.
Figure 6B:
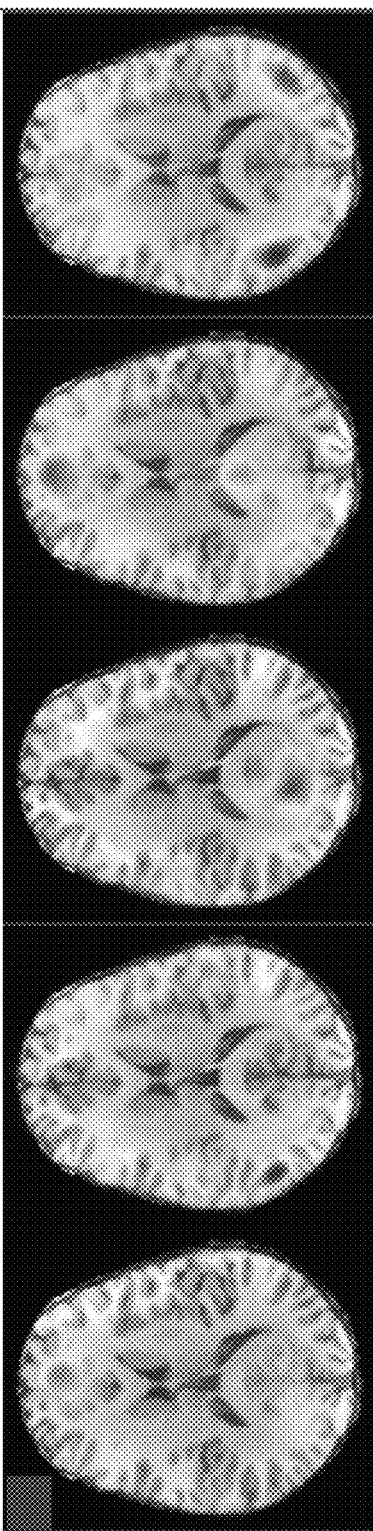
Figure 6C:
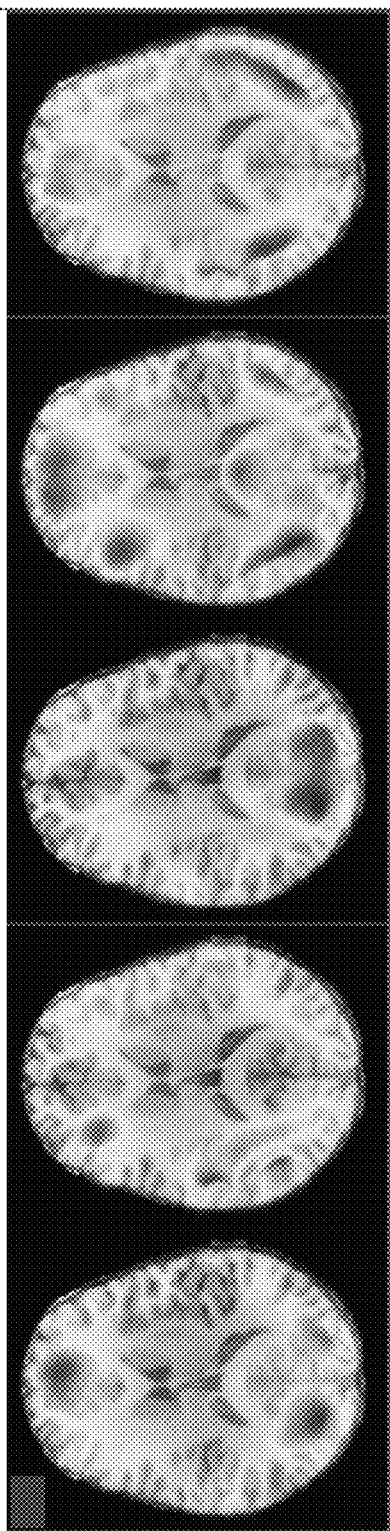

FIGS. 6A-6C illustrate several nonlinear EFD eigenmodes that were obtained using a single modality rsFMRI dataset shown in FIG. 6A, reported in Frank & Galinsky (2016). FIG. 6B shows the eigenmodes obtained using joint rsFMRI-HRA connectivity matrix (FIG. 6B), while FIG. 6C shows the results using both functional (rsFMRI) and structural (DWI+HRA) connectivity matrices—effective connectivity eigenmodes. Both the original rsFMRI-EFD modes in FIG. 6A and the rsFMRI-HRA EFD modes in FIG. 6B clearly show the BOLD activation patterns with improved localization of modes in the areas of gray matter and refined details appearing in FIG. 6B. The effective connectivity eigenmodes in FIG. 6C show the additional connectivity through white matter tracs, providing better overall spatial resolution due to the addition of high resolution anatomical details in FMRI EFD coupling.

Combining DWI, FMRI and HRA dataset through the joint coupling matrix Eqn. 4 produces effective connectivity eigenmodes FIG. 6C that spread through the entire brain volume, covering both gray and white matter areas, hence complimenting cortical activation regions available from FMRI with white matter structural pathways available from diffusion data.

We would like to emphasize that in contrast to functional modes estimated from single modality rsFMRI processing, where the signal reflects BOLD activity happening mostly in the gray matter regions, the effective connectivity modes generated by multiple modalities incorporate not only gray matter (GM) regions, but may also include white matter (WM) as well. This does not mean that our joint modality processing detects BOLD activity in the white matter. The extension of the modes into the WM is a manifestation of the fact that both functional and structural connectivity are related to a common origin—the brain neural structure—and often functional and structural dependencies may be deduced (although with limited degree of accuracy and reliability) one from the other (Skudlarski et al., 2008; Honey et al., 2009b).

Figure 7:
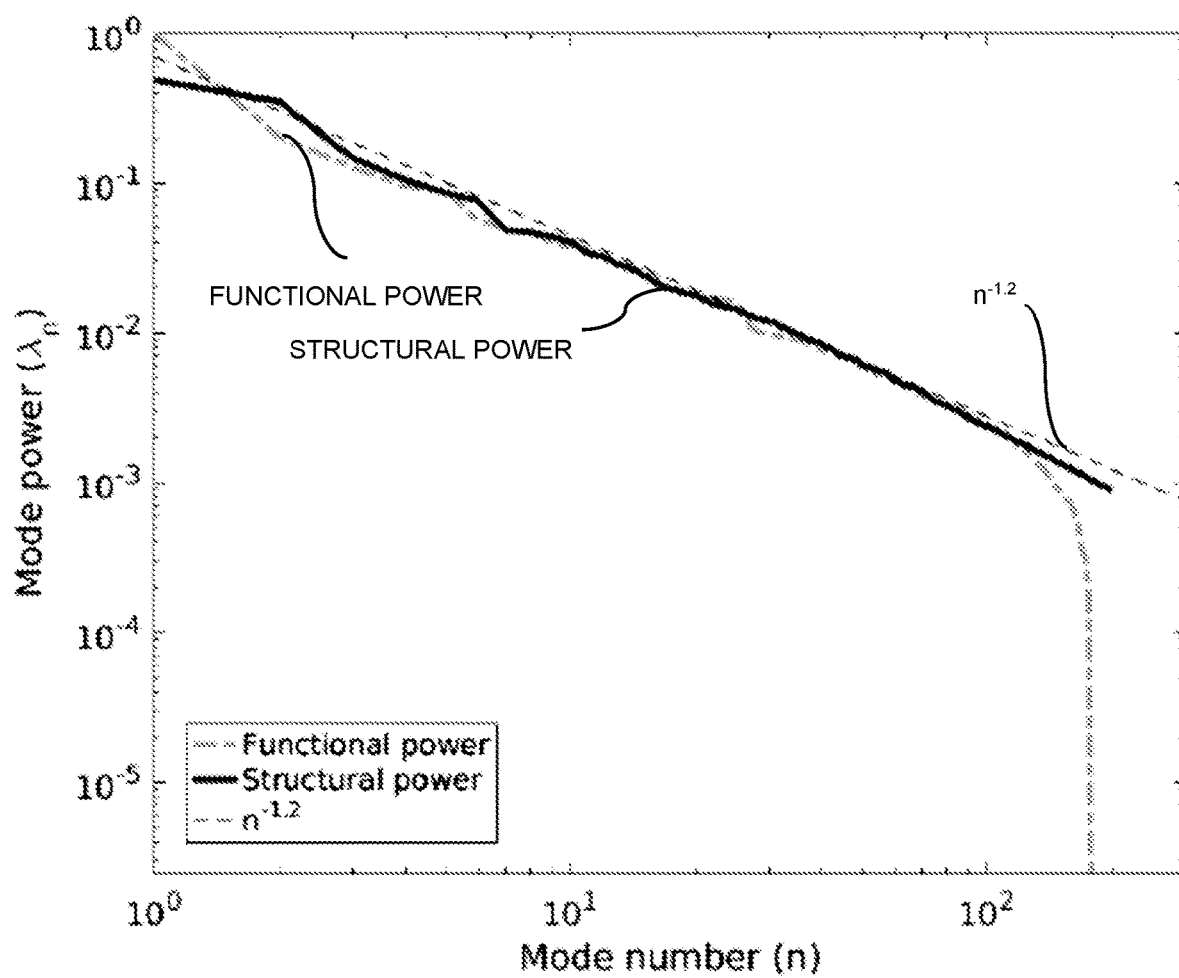
FIG. 7 is a log-log plot of power in structural (solid line) and functional (dash-dot line) modes as a function of mode number. Thin dashed line shows $n^{-1.2}$ dependence. Both functional and structural spectra show the same scale-free power law behavior, with faster decay of functional modes for mode numbers above 100 due to loss of resolution.

The common underlying nature of both structural and functional modes can be clearly seen when plotting mode power (or eigenvalue) as a function of mode number, as shown in FIG. 7. The plot shown includes 200 structural eigenmodes and 180 functional EFD modes obtained from DWI+HRA and FMRI+HRA coupling matrices. Both structural and functional dependencies show power law decay with the same exponent that is close to (−1.2). This type of power law dependence can typically be associated with a manifestation of scale-free organization of brain networks (Beggs & Timme, 2012).

Figure 8:
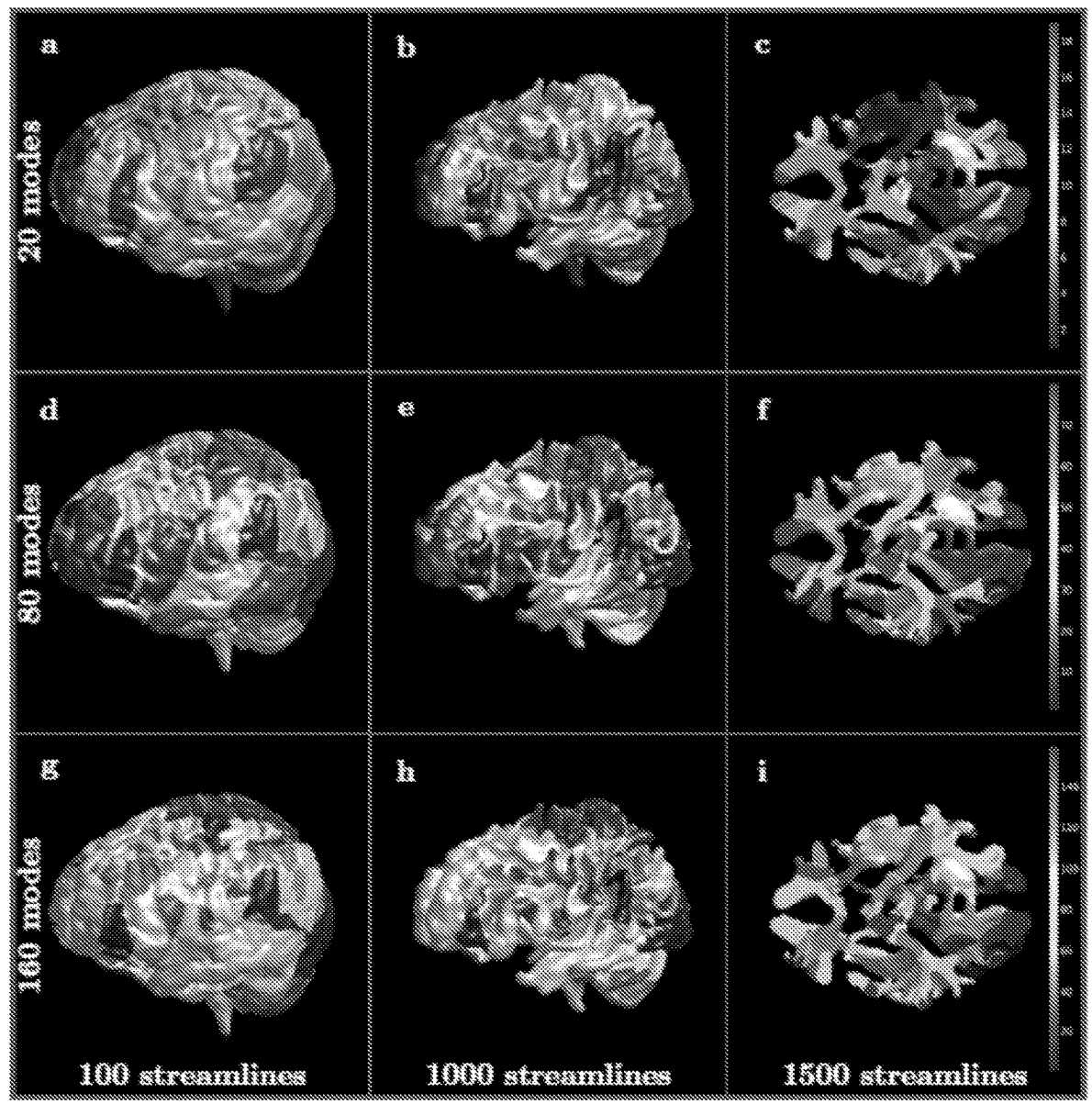
FIG. 8 shows whole brain volumetric parcellation of the CFMRI HRA+DWI+FMRI datasets produced by effective connectivity eigenmodes that were generated using joint functional (rsFMRI) and structural (DWI+HRA) connectivity matrix. Panels (a-c) show parcellation using 20 of the first most significant modes, panels (d-f) use 80 of the most significant modes, and panels (g-i) apply parcellation using 160 modes. The shapes shown in all panels are obtained by counting the number of streamlines in each voxel after performing whole brain tractography with 5,000,000 total seed, and using different thresholds for the number of streamlines from 100 in (a,d,g), to 1000 in (b,e,h), to 1500 in (c,f,i). Panels (c,f,i) contain volume cut to show the internal structure of the modes.
Figure 9:
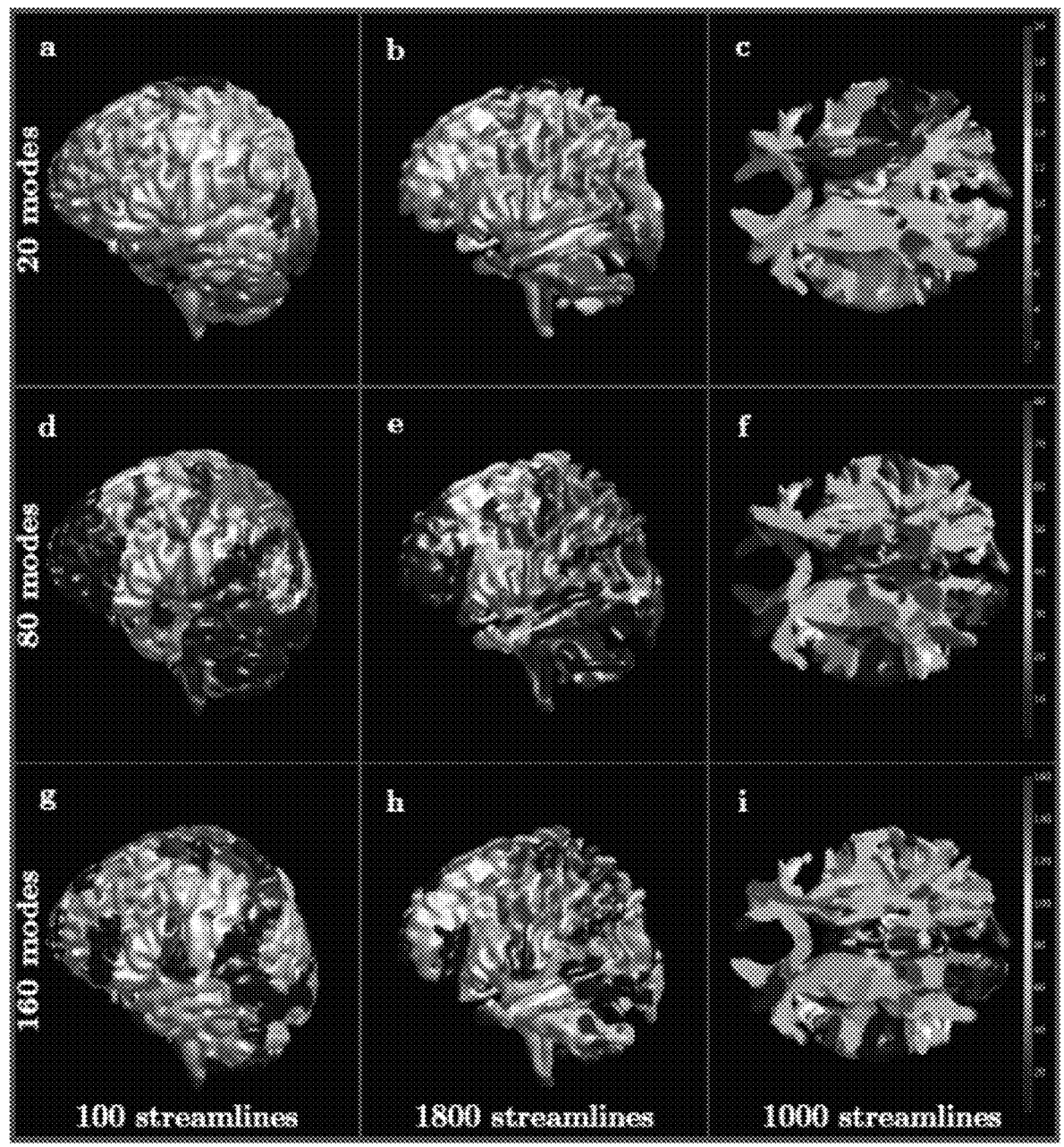
FIG. 9 shows whole brain volumetric parcellation of the HCP HRA+DWI+FMRI datasets produced by effective connectivity eigenmodes that were generated using joint functional (rsFMRI) and structural (DWI+HRA) connectivity matrix. Panels (a-c) show parcellation using 20 of the first most significant modes, panels (d-f) use 80 of the most significant modes, and panels (g-i) apply parcellation using 160 modes. The shapes shown in all panels are obtained by counting the number of streamlines in each voxel after performing whole brain tractography with 5,000,000 total seeds, and using different thresholds for the number of effective connectivity mode streamlines from 100 in (a,d,g), to 1000 in (c,f,i), to 1800 in (b,e,h). Panels (c,f,i) contain volume cut to show the internal structure of the modes.

The effective connectivity eigenmodes provide a simple and efficient way to construct a whole brain volumetric parcellation by assigning each voxel to a mode that has the largest contribution to this voxel. Two parcellation examples are shown in FIGS. 8 and 9. FIG. 8 uses for analysis locally (UCSD CFMRI) acquired datasets and FIG. 9 is based on the publicly available HCP data volumes. Both figures were produced by generating high resolution volumes (with the same resolutions as the correspondent HRA volumes, i.e. 168×256×256 for FIG. 8 and 176×256×176 for FIG. 9) that contain in each voxel the number of streamlines going through this voxel. The high-resolution volumes were used to extract the shapes shown in figures using different thresholds. The parcellation is constructed from the high resolution effective connectivity eigenmodes.

Figure 10:
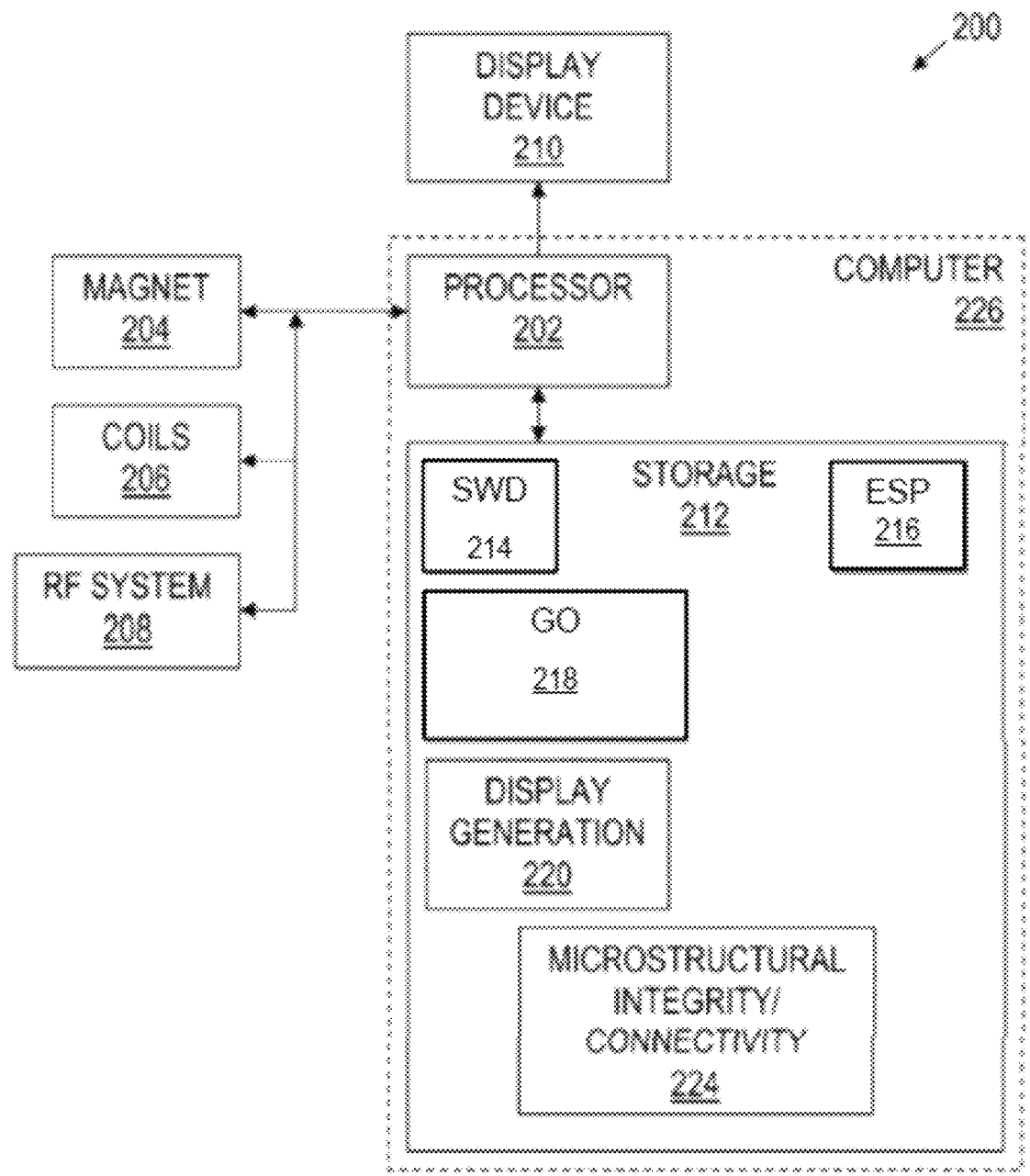
FIG. 10 is a block diagram of an exemplary imaging system in accordance with various embodiments of the invention.

FIG. 10 is a block diagram of an exemplary magnetic resonance (MR) imaging system 200. The system 200 includes a main magnet 204 to polarize the sample/subject/patient; shim coils 206 for correcting inhomogeneities in the main magnetic field; gradient coils 206 to localize the MR signal; a radio frequency (RF) system 208 which excites the sample/subject/patient and detects the resulting MR signal; and one or more computers 226 to control the aforementioned system components.

A computer 226 of the imaging system 200 comprises a processor 202 and storage 212. Suitable processors include, for example, general-purpose processors, digital signal processors, and microcontrollers. Processor architectures generally include processing units, storage, instruction decoding, peripherals, input/output systems, one or more user interfaces, and various other components and sub-systems. The storage 212 includes a computer-readable storage medium.

Software programming executable by the processor 202 may be stored in the storage 212. More specifically, the storage 212 contains software instructions that, when executed by the processor 202, causes the processor 202 to acquire multi-shell diffusion weighted magnetic resonance (MRI) data in the region of interest ("ROI") and process it using a spherical wave decomposition (SWD) module (SWD module 214); compute entropy spectrum pathways (ESP) (ESP module 216); perform ray tracing using a geometric optics tractography algorithm (GO module 218) to generate graphical images of fiber tracts for display (e.g., on display device 210, which may be any device suitable for displaying graphic data) the microstructural integrity and/or connectivity of ROI based on the computed MD and FA (microstructural integrity/connectivity module 224). More particularly, the software instructions stored in the storage 212 cause the processor 202 to display the microstructural integrity and/or connectivity of ROI based on the SWD, ESP and GO computations.

Additionally, the software instructions stored in the storage 212 may cause the processor 202 to perform various other operations described herein. In some cases, one or more of the modules may be executed using a second computer of the imaging system. (Even if the second computer is not originally or initially part of the imaging system 200, it is considered part of the imaging system 200.) The computers of the imaging system 200 are interconnected and configured to communicate with one another and perform tasks in an integrated manner. For example, each computer would be in communication the other's storage.

In other cases, a computer system (similar to the computer 226), whether it is part of the imaging system 200 or not, may be used for post-processing of diffusion MRI data that have been acquired. In this disclosure, such a computer system comprises one or more computers and the computers are interconnected and are configured for communicating with one another and performing tasks in an integrated manner. For example, each computer has access to another's storage. Such a computer system may comprise a processor and a computer-readable storage medium (CRSM). The CRSM contains software that, when executed by the processor, causes the processor to obtain diffusion magnetic resonance (MRI) data in region of interest (ROI) in a patient and process the data by performing spherical wave decomposition (SWD), entropy spectrum pathway (ESP) analysis and applying geometric optics (GO) algorithms to execute ray tracing operations to define fiber tracts for display on a display device 210.

The approach described herein provides for the joint estimation of the structural-functional brain modes that can be applied to the three primary neuro-MRI modalities—high resolution anatomical (HRA) data, diffusion tensor imaging (DTI) data, and resting state functional MRI (rsFMRI) data. The approach is rooted in our previous theoretical formulations of the SWD, GO-ESP, and EFD methods, which utilize our general theory of Entropy Spectrum Pathways (ESP) (Frank & Galinsky, 2014), whose central concept is that relationships between local and global aspects of a lattice (e.g., a 3-D image or a 4-D time dependent image) are characterized by the relationship, or coupling, between local elements (i.e., voxels). The SWD is a straightforward characterization of the intensity variations in HRA image volume in terms of a spherical wave decomposition (Galinsky & Frank, 2014). The GO-ESP technique uses the SWD to characterize the diffusion signal in each voxel from DWI acquisitions wherein a region of q-space is sampled (Galinsky & Frank, 2015). These local (i.e., voxel) diffusion profiles are then used to construct coupling matrices that, through the ESP theory, provide optimal spatial pathways that can be used to drive the geometric optics-based tractography. In the EFD method for FMRI, spatial-temporal coupling matrices from the 4D data are used to generate optimal space-time paths from which brain networks are constructed (Frank & Galinsky, 2016). The approaches described herein are directed to a general theory of structural-functional brain modes that integrates these methods through a generalization of the coupling structure of the data to incorporate the different modalities, and then by modifying the individual algorithms to incorporate the coupling between modalities.

The described computational implementation demonstrates a significant improvement of mode reconstruction accuracy and an appearance of new levels of detail. The fiber pathway reconstruction of joint modality processing offers a more than twofold improvement of the DWI spatial resolution and the ability to resolve crossing fibers at or below 10° angular resolution (Galinsky & Frank, 2016a). The resting state brain network modes, eigenmodes, and tractography generated provide more than four times the improvement in spatial resolution. Moreover, this joint estimation procedure allowed us to demonstrate the novel finding of a scale-free organization of brain structural and functional networks that follow virtually identical power laws. Further exploration of this finding may help to uncover important structure-function relations in human brain development.

In addition to providing an overall increase in resolution, accuracy, level of detail and information content that can provide valuable insight into structure-function relations of interest in basic neuroimaging studies, this method also holds the potential to enhance the clinical utility of these individual neuroimaging methods. The current procedure of analyzing these data separately poses a significant challenge for practicing clinicians faced with the task of visually integrating the information from these complex image acquisitions. This new method provides a robust and accurate method for integrating these data to provide a more accurate assessment of brain structure and function that is nonetheless amenable to clear visualization and statistical assessment via non-linear registration that are critical to the development of viable clinical protocols.

Example 2: Neuro-MRI/EEG/MEG Data Analysis

In order to be able to include EEG/MEG datasets into the JESTER joint estimation scheme, we first need to develop an approximation for the volumetric distribution of electrostatic potential inside the MRI domain. In a most general form, this approximation can be derived using Maxwell equations in a medium. Nevertheless, this is an inherently ill-posed inverse problem that requires regularization. Available multi-modal MRI volumes can be used as constraints to restrict a space of available solutions.

Brain electromagnetic activity can be described using Gauss's and Ampere's laws from macroscopic Maxwell equations $$\nabla \cdot D = \rho_i$$

$$\nabla \times H = J + \frac{\partial D}{\partial t},$$

where $D(t, x)$ is the displacement field and $H(t, x)$ is the magnetizing field. The source terms in these equations include a density of free charges $\rho(x)$ and a free current density $J(x)$. Assuming linear electrostatic and magnetostatic properties of the brain tissues, i.e., using the relations $D_\omega = \varepsilon E_\omega$, $H_\omega = 1/\mu B_\omega$, where $E(t, x)$ is the electric field, $B(t, x)$ is the magnetic field, and $\varepsilon$ and $\mu$ are the permittivity and permeability coefficients, that may depend on the frequency $\omega$. Alternatively, both of these equations can be expressed in the form of a single charge continuity equation:

$$\frac{\partial \rho}{\partial t} + \nabla \cdot J = 0$$

Using electrostatic potential $\varphi(E=-\nabla\varphi)$ and Ohm's law $J=\Sigma \cdot E$, the charge continuity equation can be rewritten as $$\frac{\partial}{\partial t}(\nabla \cdot \varepsilon \nabla \phi) + \nabla \cdot \Sigma \cdot \nabla \phi = 0, \tag{33}$$

where $\Sigma = \{\Sigma^{ij}\}$ is a local tissue conductivity tensor. Taking the temporal Fourier transform (i.e., replacing $\partial/\partial t \to -I\omega$, $I^2=-1$), this can be written in tensor form as $$(\Sigma^{ij} - I\omega\varepsilon\delta^{ij})\partial_i\partial_j\phi_\omega = [I\omega(\partial_i\varepsilon)\partial^{ij} - (\partial_i\Sigma^{ij})]\partial_j\phi_\omega, \quad (34)$$

where a summation is assumed over repeated indices.

Rearranging the above expression to separate the isotropic and homogeneous terms gives $$\hat{L}\phi_\omega = \hat{R}\phi_\omega \quad (35)$$

written in terms of the operators $$\hat{L} \equiv \partial^i \partial_i$$

$$\hat{R} \equiv \frac{\sigma + I\omega\varepsilon}{\sigma^2 + \omega^2\varepsilon^2}[I\omega(\partial_i\varepsilon)\delta^{ij} - (\partial_i\Sigma^{ij}) - (\Sigma^{ij} - \sigma\delta^{ij})\partial_i]\partial_j,$$

where $\sigma$ is an isotropic local conductivity $\sigma = \text{Tr}\Sigma/3 = \Sigma_i^i/3$. Terms in square brackets show that the parts of $\hat{R}\phi_\omega$ can be interpreted in terms of different tissue characteristics and may be important for understanding the origin of sources of the electro-/magnetostatic signal detected by the EEG/MEG sensors. The first term $(\omega(\partial^i\varepsilon)(\partial_i\phi_\omega))$ corresponds to areas with sudden change in permittivity, e.g., the white-gray matter interface. The second term $((\partial_i\Sigma^{ij})(\partial_j\phi_\omega))$ corresponds to regions where the conductivity gradient is the strongest, i.e., the gray matter/CSF boundary. Finally, the last term $(\Sigma^{ij}\partial_i\partial_j\phi_\omega - \sigma\partial^i\partial_i\phi_\omega)$ includes areas with the strongest conductivity anisotropies, e.g., input from major white matter tracts.

For this example, it is assumed that we have the three standard neuro-MRI acquisitions: HRA, DTI, and rsFMRI. The data from these modalities can be used to constrain the values of $\Sigma$ and $\varepsilon$. The DTI data allows the construction of estimates of the conductivity tensor anisotropy, whereas HRA and rsFMRI data is useful for tissue segmentation and assignment of mean values for permittivity and conductivity. Table 1 lists the dielectric properties for brain tissues at 10 Hz frequency. The dielectric parameters are based on the Gabriel dispersion relationships (Gabriel et al., 1996b,a). The tissue permittivities are shown normalized by the permittivity of vacuum $\varepsilon_0 = 8.854187817 \times 10^{-12}$ F/m.

TABLE 1

| Tissue | Source | Permittivity | Conductivity (S/m) |
|---|---|---|---|
| Grey Matter | Grey Matter | 4.07E+7 | 2.75E-2 |
| White Matter | White Matter | 2.76E+7 | 2.77E-2 |
| Cerebrospinal Fluid | Cerebrospinal Fluid | 1.09E+2 | 2.00E+0 |
| Skull Cancellous | Bone Cancellous | 1.00E+7 | 7.56E-2 |
| Skull Cortical | Bone Cortical | 5.52E+4 | 2.00E-2 |
| Skin | Skin (Dry) | 1.14E+3 | 2.00E-4 |

An approximate solution for the potential co across an entire MRI brain volume can be constructed iteratively as $$'L\phi_\omega^{(k)} = \hat{R}\phi_\omega^{(k-1)} \quad (36)$$

$$\tilde{\phi}_\omega^{(K)} = \alpha_K \sum_{k=0}^{K} \phi_\omega^{(k)} \quad (37)$$

where the single iteration forward solution can be found either by using the Green function $G(x, x') = 1/(4\pi|x-x'|)$ or by applying a Fourier-space pseudospectral approach (Gottlieb & Orszag, 1977).

We should emphasize that the use of a pseudospectral approach provides a number of important advantages over finite/boundary element (FEM/BEM) approaches most commonly performed for electrostatic modeling of brain activity (Gramfort et al., 2010; Kybic et al., 2005; von Ellenrieder et al., 2009; Gutierrez & Nehorai, 2008; Schimpf et al., 2002; Ermer et al., 2001; Mosher et al., 1999). The pseudospectral formulation does not use surface meshes and, therefore, does not require limiting the location of sources by a single surface (or small number of surfaces) with fixed number of surface-pinned static dipole sources. This is also true for target locations, as typically FEM/BEM approaches obtain the solution only at a small number of fixed position sensors. The pseudospectral approach is able to find a time-dependent spatial distribution of electrostatic potential at every space-time location of multidimensional volume as a superposition of source inputs from every voxel of the same volume. The forward solution for the electrostatic potential co can be constructed through a direct summation, i.e., using static Green function and restricting the number of sources/targets by a selected set of mesh locations, thus obtaining something equivalent to a FEM/BEM solver. Alternatively, it can be obtained as a sum of inputs from all spatial and temporal Fourier modes using frequency/wave number domain for description of both a Green function and volume distribution of sources, resulting in pseudo-spectral formulation (where the use of fast Fourier transform permits effective numerical implementation). This approach includes the distribution of both electrostatic and geometric properties of the media (conductivity, permittivity, anisotropy, inhomogeneity) at every location throughout the volume (that is guided by MRI acquisition and analysis). Thus, it models wave-like signal propagation inside the volume and should be able to describe and uncover significantly more complex dynamical behavior of the sources of the electrostatic activity recorded at the sensor locations.

An array of EEG sensors at locations $x^{(n)}$, $n=1\ldots N$ can be used to constrain the solution and find coefficients $\alpha_K$ by minimizing the deviation functional $$\mathcal{R}_\Delta^{(K)} = \min\left(\sum_{n=1}^{N}[\Phi_\omega^{(n)} - \tilde{\phi}_\omega^{(K)}(x^{(n)})]^2\right) \quad (38)$$

with an additional requirement that an approximation error $R_\Delta$ is bounded by a chosen accuracy $\epsilon$ $$\mathcal{R}_\Delta^{(K)} = \alpha_K^2\|\phi_\omega^{(K)}\| \leq \epsilon \Rightarrow \alpha_K^2 \leq \epsilon/\|\phi_\omega^{(K)}\|, \quad (39)$$

where $\Phi_\omega^{(n)}$ is a potential at frequency co detected by the sensor n. The iterations will be stopped if the convergence cannot be achieved (i.e., $\mathcal{R}_\Delta^{(K)} > \mathcal{R}_\Delta^{(K-1)}$). As an initial approximation $\phi_\omega^{(0)}$ any appropriate fit to Eqn. 38 can be used that satisfies $\partial^i\partial_i\phi_\omega^{(0)} = 0$, e.g., a linear function of coordinates $\phi_\omega^{(0)} = \beta_i x_i + \gamma$ with coefficients $\beta_i$ determined from the least square fit Eqn. 38.

This approach for finding an inverse solution can be applied to an array of MEG sensors without any modifications except a difference in a form of the deviation functional, where instead of an electrostatic potential $\tilde{\phi}_\omega^{(K)}$ at sensor location $x^{(n)}$, either magnetic flux or the projection of its gradient should be substituted for either magnetometers or gradiometers respectively (both quantities can be derived from free vacuum form of Maxwell equations).

The potential $\tilde{\phi}_\omega^{(K)}$ (Eqn. 37) is the central quantity that will be used to derive various measures. It can be calculated over arbitrary frequency ranges $\omega=\omega_1 \ldots \omega_2$ and, thus, it is possible to calculate it over the standard alpha, beta, and delta bands (or any parts or combinations of them) typically identified in EEG. These potentials can then be converted to the time domain $\tilde{\phi}(t,x)$ and used for EFD analysis (Frank & Galinsky, 2016a,b) generating time-space brain activation modes ranked by the power. Alternatively, the estimated potentials $\tilde{\phi}(t,x)$ can be used in the joint estimation scheme presented in Galinsky & Frank (2017a) as an additional modality $Q_{ij}^E$ in the intermodality coupling matrix $Q_{ij}$, resulting in cortically electrophysiologically-enhanced version of JESTER (or "CORT-JESTER") that can provide significant time resolution improvement over low frequency FMRI data.

The mathematical formulation of the EEG/MEG specific frequency co dependent coupling matrix $Q_{ij}^E$ is similar to rsFMRI, is $$Q_{ij}^E(\omega_0) = \mathcal{R}_{ij}^n d_i^F(\omega_0) d_j^E(\omega_0), \quad (40)$$

$$Q_{ij}^E(\omega_l) = \mathcal{R}_{ij}^n (\xi_i^{(1)}(\omega_0) d_j^E(\omega_l) + \xi_j^{(1)}(\omega_0) d_i^E(\omega_l)), \quad (41)$$

where $d_i^E(\omega)$ is the temporal Fourier mode of the EEG/MEG data $d^E$ with the frequency $\omega$, $\xi_i^{(1)}(\omega)$ is the eigenvector of $Q^E(\omega_0)$ that corresponds to the largest eigenvalue, and $\mathcal{R}_{ij}$ can include some function of the pair correlations taken to the nth power, for example a simple mean of the pair correlations, that is equivalent to a product of signal means ($\overline{d^E}$) for a periodic signal $$\mathcal{R}_{ij} = \frac{1}{T}\int_0^T C_{ij}(t)dt \equiv T\overline{d_i^E}\,\overline{d_j^E}, \quad (42)$$

where $C_{ij}(t)$ is the pair correlations $$C_{ij}(t) = \int d_i^E(t-\tau) d_j^E(\tau) d\tau, \quad (43)$$

The multi-sensor EEG and multi-modal MRI data were used for coupling by generation of frequency-dependent inverse Green function for every voxel inside the high resolution MRI domain using multiple layer classification of head tissues (GM, WM, CSF, scalp and skull, see Table 1) with the spherical wave decomposition (SWD) (Galinsky & Frank, 2014) based segmentation of the HRA T1 volumes.

The processing of both resting state and task-based EEG datasets HRA, DTI, and rsFMRI datasets involves the following steps:
1. Segmentation of anatomical datasets using the SWD including skull stripping and gray/white matter extraction;
2. Registration of DTI and rsFMRI datasets with the HRA dataset and extraction of functionally active modes (regions) of the brain;
3. Generation of anisotropy conductivity tissue maps from DTI data;
4. Generation of inhomogeneous permittivity tissue maps (i.e., effectively restricting possible source areas for the EEG activity) using a combination of rsFMRI activation modes and HRA/DTI gray matter, including anisotropy estimation;
5. Generation of a frequency-dependent inverse Green function for each EEG recorded frequency and solving for $\tilde{\phi}_\omega^{(K)}$ (Eqn. 37), which includes MRI-based regularization constraints;
6. Generation of FMRI-like volumes of signal time courses in each voxel for various EEG bands (including a low frequency FMRI-like range, as well as the standard alpha, beta and delta bands);
7. Extraction of space-time modes from FMRI-like EEG volumes using the JESTER procedure.

Several independent sources of MRI, EEG and MEG datasets were used for testing and validation of the CORT-JESTER algorithms. The variety of selected datasets allows targeting of different aspects of algorithm performance. This may include assessment of mode repeatability and both intra- and inter-subject similarity for different subjects, sessions and stimuli, assessment of importance and effects of different modalities in simultaneous EEG/rsFMRI acquisitions, comparison of modes between EEG and MEG, etc. Some of these datasets are publicly accessible and available from the open source Human Connectome Project (Van Essen et al., 2013, 2012; Sotiropoulos et al., 2013), and include the HRA T1 volumes, the DTI volumes, as well as resting state and task based FMRI and MEG acquisitions (CONNECTOME-D). The HCP datasets were collected on the customized Siemens 3T Connectom scanner, which is a modified 3T Skyra system (MAGNE-TOM Skyra Siemens Healthcare), housed at the MGH/HST Athinoula A. Martinos Center for Biomedical Imaging (see Setsompop et al. (2013) for details of the scanner design and implementation). A 64-channel, tight-fitting brain array coil (Keil et al., 2013) was used for data acquisition. The dataset contains 96 slices of 140×140 matrix (1.5 mm linear voxel size) at four levels of diffusion sensitizations (b-values b=1 k, 3 k, 5 k and 10 k s/mm2) distributed over 552 total q-vectors.

HCP MEG data acquisition was performed on a whole head MAGNES 3600 (4D Neuroimaging, San Diego, Calif.) system housed in a magnetically shielded room, located at the Saint Louis University (SLU) medical campus. The sampling rate was selected to be as high as possible (2034.51 Hz) while collecting all channels (248 magnetometer channels together with 23 reference channels). Bandwidth was set (at DC, 400 Hz) to capture physiological signals.

Several HRA, DTI and rsFMRI datasets were collected locally at the UCSD Center for Functional MRI (CFMRI). The CFMRI data were acquired with a 3T GE Discovery MR750 whole body system (CFMRI-D). The anatomical T1 volumes have 168×256×256 voxel size with 1.2×0.9375× 0.9375 mm3 resolution. A multiband DTI EPI acquisition (Setsompop et al., 2011) developed at the CFMRI employed three simultaneous slice excitations to acquire data with three diffusion sensitizations (at b-values b=1000/2000/3000 s/mm2) for 30, 45 and 65 different diffusion gradients (respectively) uniformly distributed over a unit sphere. Several baseline (b=0) images were also recorded. The data were reconstructed offline using the CFMRI's multiband reconstruction routines. The DWI datasets have 100×100× 72 matrix size with 2×2×2 mm3 resolution.

Whole brain BOLD resting-state data were acquired over thirty axial slices using an echo planar imaging (EPI) sequence (flip angle=70°, slice thickness=4 mm, slice gap=1 mm, FOV=24 cm, TE=30 ms, TR=1.8 s, matrix size=64× 64×30). Further details are available in Wong et al. (2013). All data were pre-processed using the standard pre-processing analysis pathway at the CFMRI (as described in Wong et al. (2013)). Nuisance terms were removed from the resting-state BOLD time series through multiple linear regression. These nuisance regressors included: i) linear and quadratic trends; ii) six motion parameters estimated during image co-registration and their first derivatives; iii) RET-ROICOR (2nd order Fourier series) (Glover et al., 2000) and RVHRCOR (Chang & Glover, 2009) physiological noise terms calculated from the cardiac and respiratory signals; and iv) the mean BOLD signals calculated from white matter and CSF regions and their first respective derivatives, where these regions were defined using partial volume thresholds of 0.99 for each tissue type and morphological erosion of two voxels in each direction to minimize partial voluming with gray matter.

For EEG and same subject MRI CORT-JESTER testing and validation, several datasets from two unrelated studies were used.

The first study concentrated on detection of effects of medication on the resting state EEG and FMRI. All the datasets for this study were collected at the Laureate Institute for Brain Research (Zotev et al., 2016) and include simultaneously acquired EEG and rsFMRI recordings at 4 ms for 500 s as well as HRA T1 volumes (LIBR-D). Additionally, these simultaneous EEG and rsFMRI acquisitions for each subject were repeated tree times. In this example, we used these simultaneous and repeated EEG and rsFMRI acquisitions to study repeatability of the CORT-JESTER approach.

The second set of multimodal (EEG and MRI) datasets was acquired by the Javitt Group in Nathan Kline Institute for Psychiatric Research (Javitt, 2009; Javitt & Sweet, 2015). The data includes task and resting state EEG and FMRI recordings at 2 ms for about 30 min total and HRA T1 volumes (NKIPR-D). The task-based EEG and FMRI datasets contain several acquisitions of response for similar stimuli that can be used for test-retest purposes.

Figure 11:
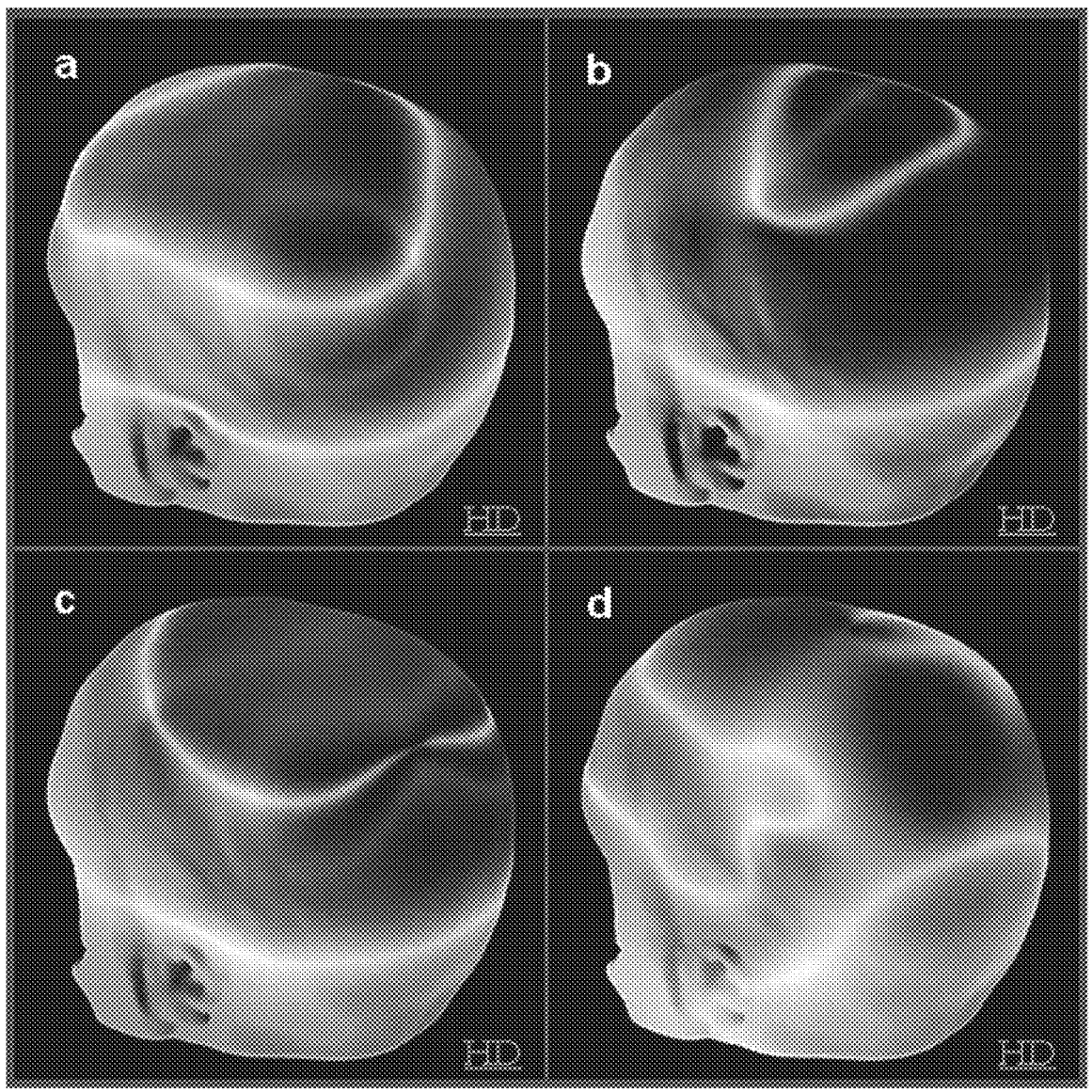
FIG. 11 shows four sample time shots of skull electric field distributions produced by different FMRI functional modes estimated using JESTER.
Figure 12:
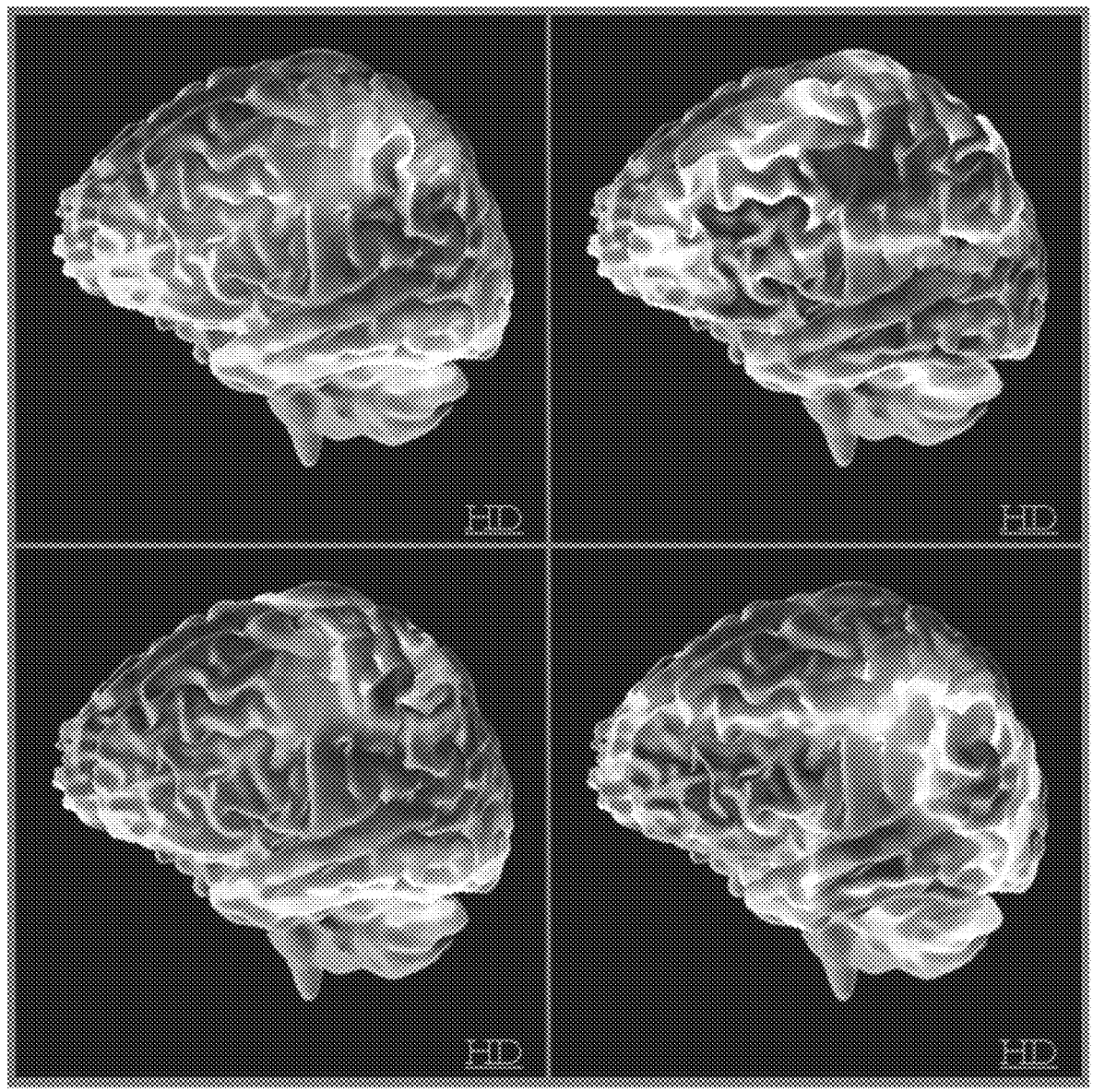
FIG. 12 provides time shots of brain electric field distributions produced by the same FMRI functional modes as in FIG. 11 estimated using JESTER.

Functional modes (Frank & Galinsky, 2016b) estimated from rsFMRI (CFMRI-D) with JESTER (Galinsky & Frank, 2017b) show the brain's functional organization and functional connectivity through a number of consistent networks at different stages of consciousness and, thus, represent specific patterns of synchronous activity. This synchronism can be assumed to be related to different space-time sources of electrophysiological activity. Therefore, we can use those modes to find what low frequency response they will generate at EEG/MEG sensor positions. Several examples of generated space-time distributions of the electric fields at the skull and at the cortex are shown in FIG. 11 and FIG. 12, which, respectively, illustrate several time shots of skull and brain electric field distributions produced by different FMRI functional modes estimated using JESTER.

Figure 13:
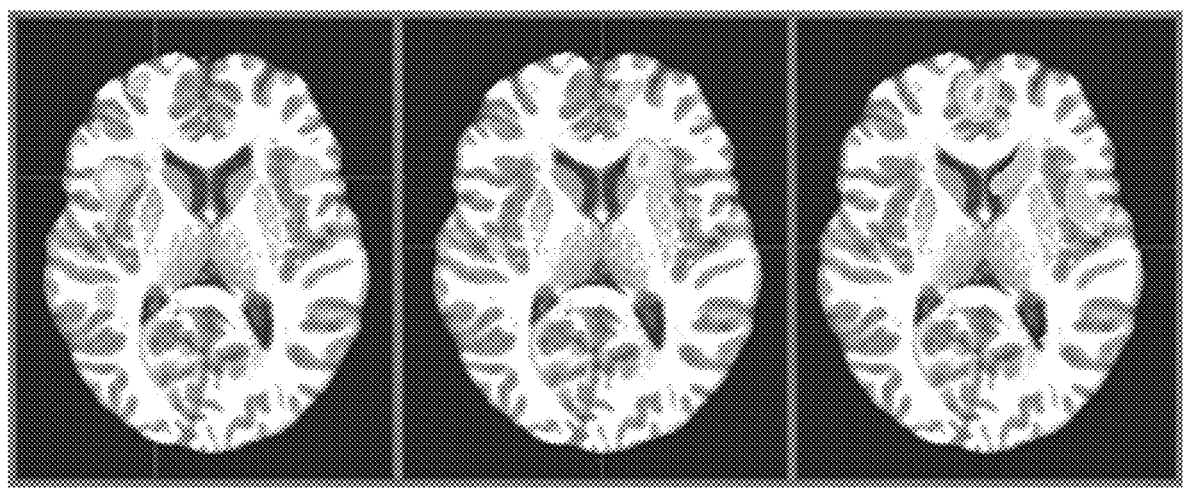
FIG. 13 provides examples of activation modes created from MEG data using JESTER and constrained by high resolution anatomical MRI data.

MEG datasets (CONNECTOME-D) with relatively large number of sensors comparing to EEG (248 magnetometer and 23 reference channels vs 32 or 64 head sensors and 1 reference) provide for the determination of detailed space-time wave activity modes. Several examples of these modes are shown in FIG. 13, which provides a demonstration of activation modes created from MEG data using JESTER and constrained by high resolution anatomical MRI data. In FIG. 13, activated regions are (left) bilateral anterior insula, which is among the most common activation patterns in rsFMRI, (middle) right caudate, and (right) medial frontal gyrus.

The high resolution anatomical and diffusion weighted datasets were used for tissue classification and assignment of electro/magneto-static properties for each voxel. Selected at random activation modes include bilateral anterior insula, which is among the most common activation patterns in rsFMRI as well as the area that is most commonly dysfunctional in psychiatric disorders (Goodkind et al., 2015), right caudate, and medial frontal gyrus. No rsFMRI data was used for the CONNECTOME-D analysis.

Generally speaking, the combination of rsFMRI spatial activation modes and HRA/DTI gray matter estimations is used only for setting the volumetric inhomogeneous distribution of permittivity. That is, rsFMRI modes can only constrain source regions indirectly by their influence in shaping the volumetric permittivity distribution. The additional information that rsFMRI provides is expected to result in a relatively small (may be even marginal) overall improvement, due to low resolution. Nevertheless, even without the use of rsFMRI modes, the MEG activation patterns in FIG. 13 still shows patterns that are among the most common activation patterns observed by rsFMRI.

Figure 14:
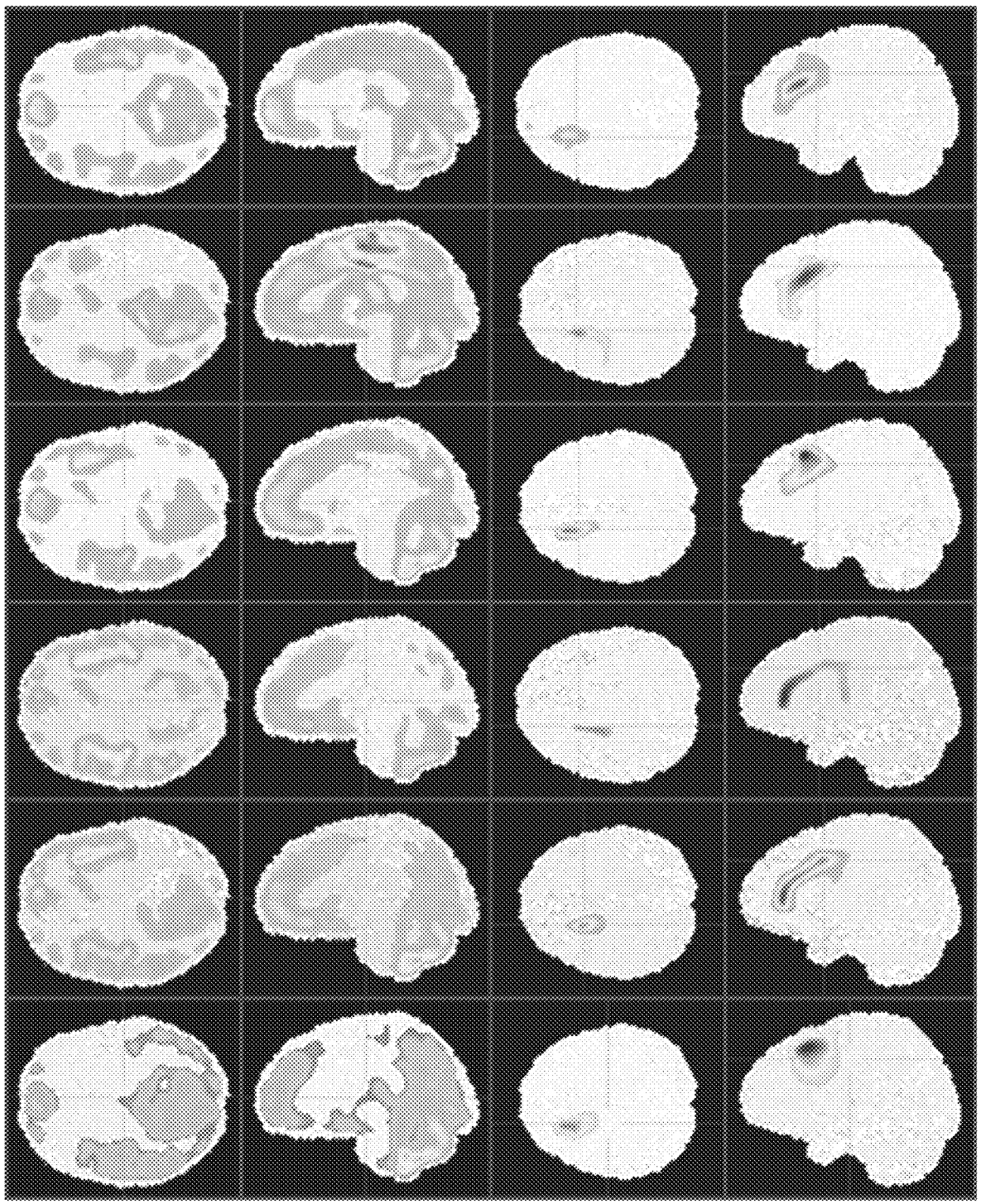
FIG. 14 shows EEG functional modes detected from volumes generated by CORT-JESTER.

The first set of EEG data (LIBR-D) was recorded with relatively sparse spatial array of sensors (32 head sensors plus 1 reference) with temporal resolution of 4 ms. The data acquisition was completed during a rest state without task-based stimuli simultaneously with acquisition of functional MRI volumes. For each subject, three recording sessions were conducted. The CORT-JESTER procedure was used to generate a new volume for each EEG set with the same spatial and temporal resolution as the FMRI dataset (2 mm×2 mm×2 mm×2 s and 80×95×75 voxels with 237 time points). Each volume was then used in EFD procedure to generate activation modes in the same way it is done for FMRI volumes. FIG. 14 shows two randomly selected modes for two subjects for all three sessions. Both subjects and modes show very good mode similarity between sessions and at the same time some noticeable subject differences. To quantitatively evaluate mode repeatability, we used the intraclass correlation coefficient (Sokal & Rohlf, 1995) (ICC) calculated as a ratio of variance across mode groups to the total variance. For two mode groups shown in FIG. 14 the ICC is equal to 0.9985. For several other mode groups (not shown) ICC values from 0.9 to 0.99 and higher were obtained.

The LIBR-D set includes simultaneously acquired EEG and FMRI volumes (both task based and resting state) and potentially facilitates a study of correspondence between EEG and FMRI. This is clearly an important question and a number of studies have appeared recently that focus on simultaneous acquisition techniques and provide attempts to confirm (or rebut) the existence of correlations between EEG and FMRI data at different frequency bands or under different acquisition conditions (Meyer, van Oort, & Barth, 2013; Musso et al., 2010; Fellner et al., 2016; Meyer, Janssen, et al., 2013; Chang et al., 2013; Mantini et al., 2007). While the question of FMRI-EEG concordance is important, the results of this experiment are not suggested as proving or disproving existence of the EEG-rsFMRI concordance. Rather, the intent is to provide a method for use of complementary features from EEG and FMRI modalities (Allen et al., 2018), e.g., the difference in temporal and spatial resolution, to enhance estimation of brain activation modes.

Figure 15:
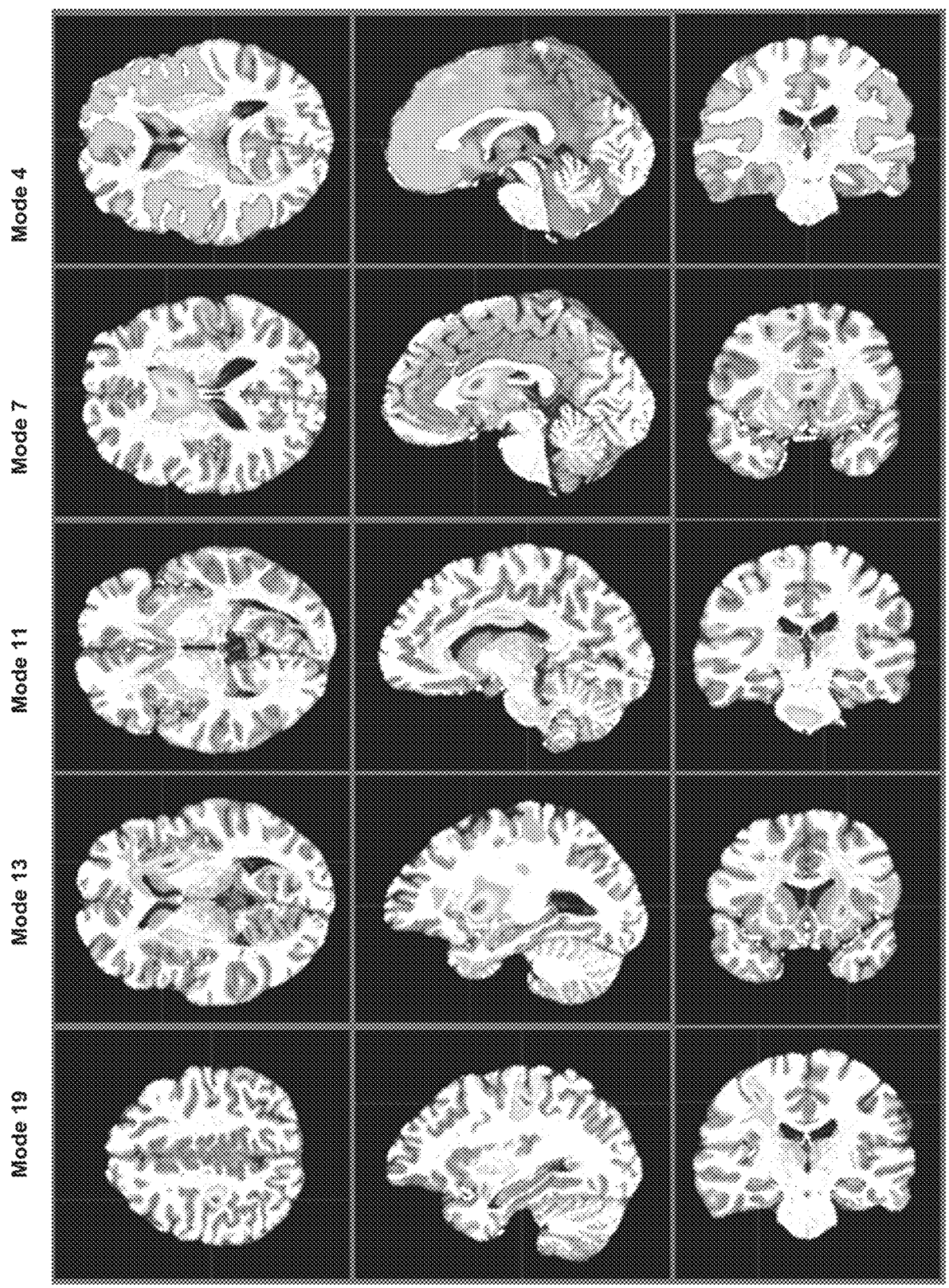
FIG. 15 shows resting state EEG functional modes generated for alpha band using HRA spatial resolution (1 mm×1 mm×1 mm and 161×191×151 voxels).

FIG. 15 illustrates several EEG functional modes generated for alpha band using higher spatial resolution (the same resolution as in HRA acquisition, 1 mm×1 mm×1 mm and 161×191×151 voxels with 237 time points).

Figure 16A:
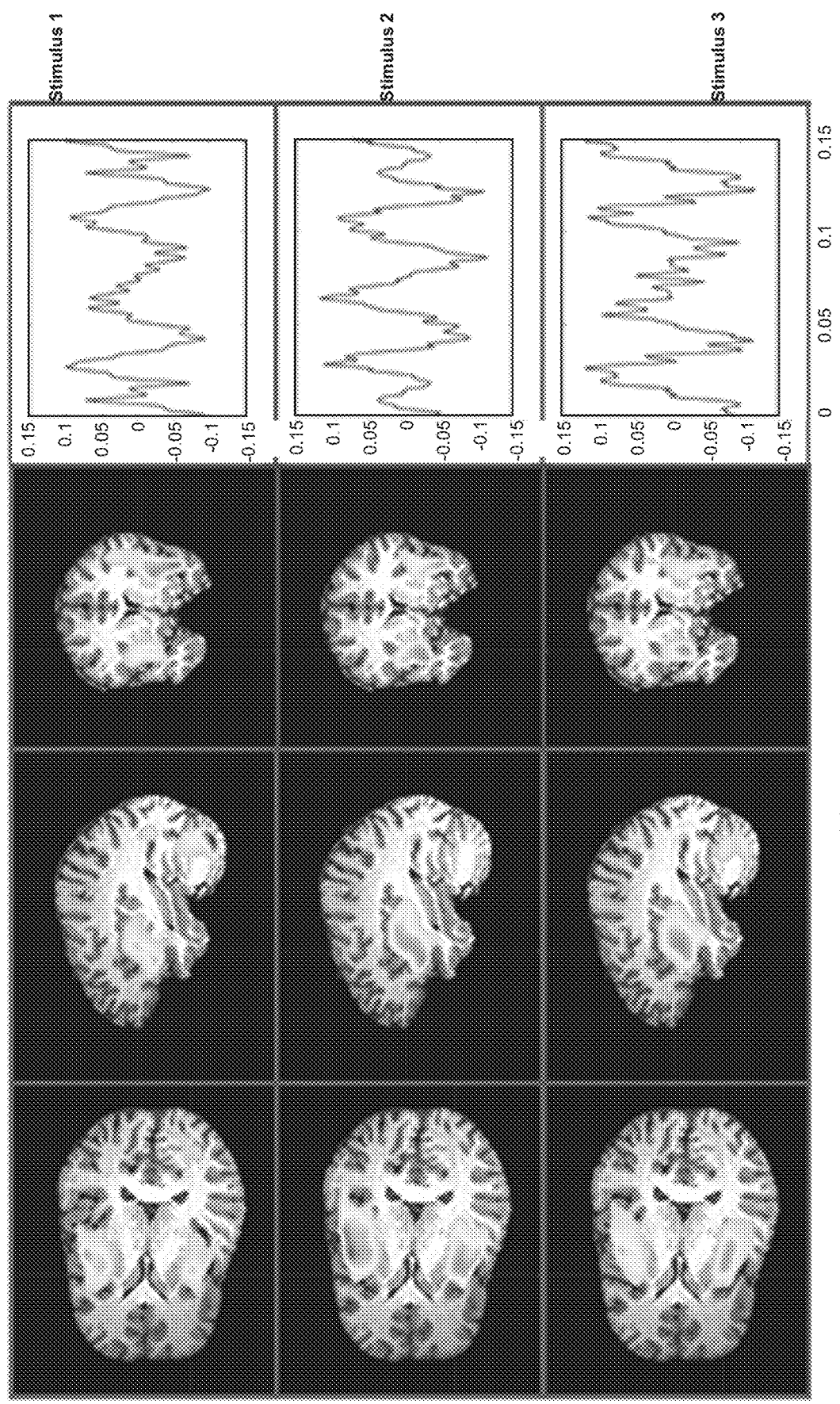
FIGS. 16A and 16B illustrate task-based EEG functional modes generated by CORT-JESTER for two subjects, respectively, using alpha EEG band. The first three columns show three spatial projections, the fourth column shows a temporal course (using seconds for the duration units and arbitrary normalization for the amplitude).
Figure 16B:
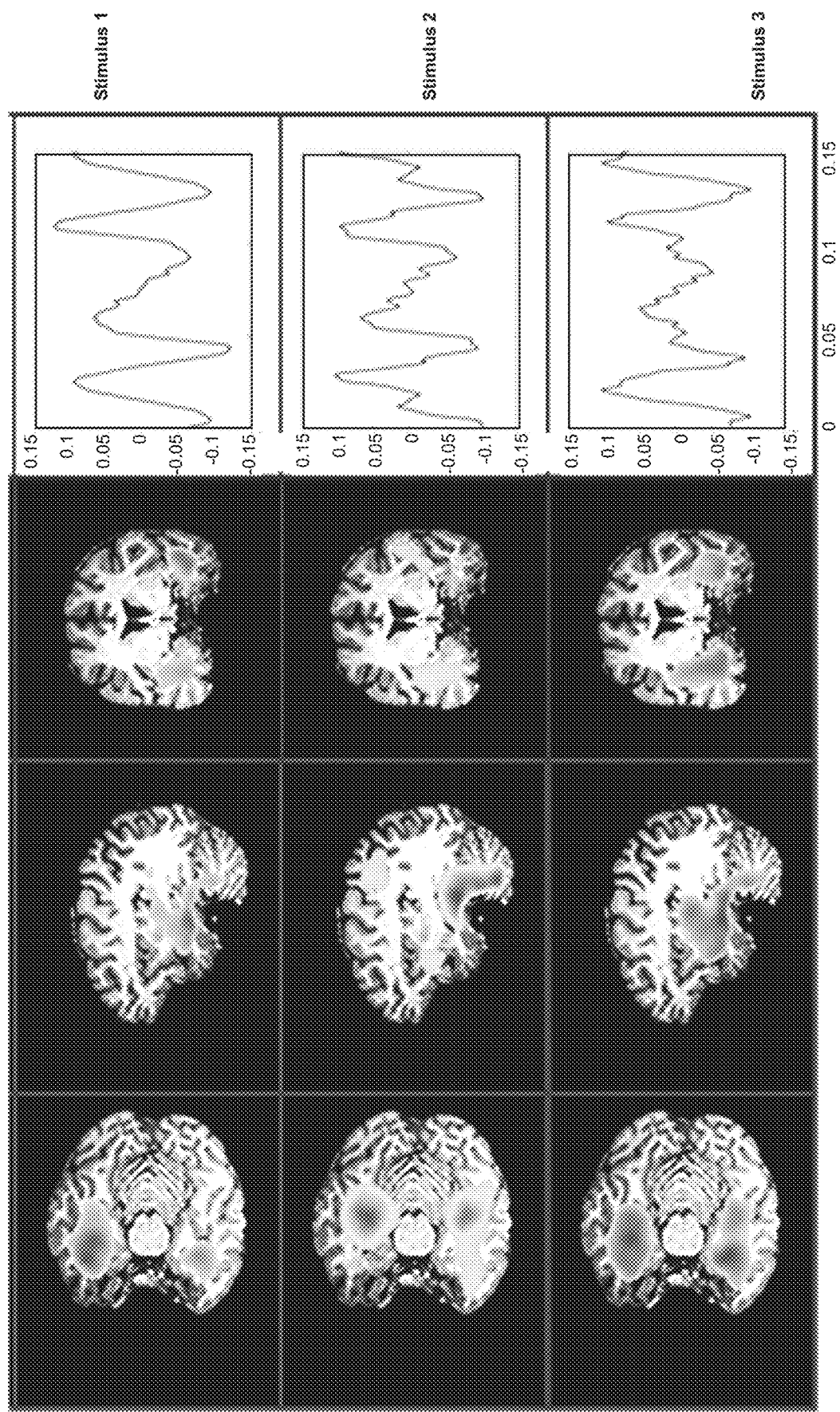

The second set of EEG data (NKIPR-D) was recorded with higher number of sensors (64 head sensors plus 1 reference) and with higher temporal resolution as well (2 ms). The data acquisition included both resting state and 3 different stimuli for various tasks. FIGS. 16A and 16B show several EEG functional modes generated for two subjects using alpha band task stimuli (the spatial resolution from HRA volume is 1 mm×1 mm×1 mm and 192×256×256 voxels and the number of time points is 123). The fourth column in each figure plots a temporal course, where the duration units (x-axis) are in seconds and the y-axis represents amplitude with arbitrary normalization. The modes exhibit significant similarity between similar stimuli in each subject.

The foregoing example illustrates extension of the theory for the joint estimation of the structural-functional brain modes, that have been initially applied to the three primary neuro-MRI modalities—high resolution anatomical (HRA) data, diffusion tensor imaging (DTI) data, and resting state functional MRI (rsFMRI) data, to include high temporal resolution EEG and EEG modalities.

Joint estimation refers to estimation of activation modes that includes (as a first step) the EEG time course reconstruction at each voxel location using EM parameters estimated from the various modalities of MRI, followed by the multimodal activation mode estimation that includes a combination of both MRI and EEG/MEG modalities.

When applied to multi-modal MRI/EEG/MEG resting and task-based dataset, the JESTER method exhibited good repeatability and similarity between subjects, with the intra-class correlation coefficient ranging from 0.9 to higher than 0.99. This method may potentially have broad implications for both basic neuroscience and clinical studies by enhancing the spatial-temporal resolution of the estimates derived from current neuroimaging modalities, thereby providing an improved picture of the normal human brain in basic neuroimaging experiments and variations associated with disease states.

In addition to providing an overall increase in resolution, accuracy, level of detail and information content that can provide valuable insight into structure-function relations of interest in basic neuroimaging studies, the JESTER method also holds the potential to enhance the clinical utility of these individual neuroimaging methods. The current procedure of analyzing these data separately poses a significant challenge for practicing clinicians faced with the task of visually integrating the information from a variety of complex modalities. This new method provides a robust and accurate method for integrating these data to provide a more accurate assessment of brain structure and function that is nonetheless amenable to clear visualization and statistical assessment via non-linear registrations that are critical to the development of viable clinical protocols.

Example 3: Detection of Meteorological Events

Current analysis methods in severe weather meteorology rely on essentially qualitative methods based on standard graphics methods such as isosurface rendering of calculated parameters. Mobile Doppler radar systems, such as the DOW (Doppler on Wheels) program have made dramatic improvements in the accuracy, stability, and resolution of their systems, resulting in ever increasing quality of the spatio-temporal data in tornadic storms. The problem rests on the ability to accurately and robustly analyze spatio-temporal phenomenon in time-resolved volumetric multi-variate and noisy data sets. The difficulties in formulating a quantitative approach to this problem are not unique to severe weather meteorology, but appear in other fields of image or multivariate data analysis as well.

International Patent Publication WO 2016/176684 of the present inventors describes the application of EFD analysis for the characterization of tornadic supercells using input data from a conventional Doppler radar system. In the context of mobile Doppler radar data, the EFD approach allows coupling to be defined in terms of parameters resulting from the standard objective analysis, giving a flexibility to use scalar or vector (or even multiscale tensor) coupling. Using the EFD approach ranked modes of the storm can be produced that clearly reveal the spatial temporal modes of the critical variables in tornadogenesis, such as tilt, stretch and vorticity. The generation and intensification of low-level rotation is readily apparent in the major modes detected by EFD, and appears to be consistent with recent theories focusing on the role of the descending reflectivity core. This core, and the convergence, intensification, and coalescence of the vorticity as mediated by the tilt and stretch are automatically detected and quantified using the EFD method, providing new insight into the quantitative dynamics of tornadogenesis, while offering the possibility of an analysis system capable of being used in conjunction with severe weather radar instrumentation to develop early warning systems.

Application of the EFD method to analysis of weather data will enable commercial development of a severe weather detection and warning system. The EFD method offers the possibility of an automated detection of severe weather events and thus a much more efficient means of processing Doppler radar data.

The JESTER method described herein extends the information obtained from the inventors' previously-disclosed EFD method as used on Doppler radar data to allow integration of other meteorological modalities commonly used for weather forecasting. In addition to Doppler radar, tools commonly used for forecasting include weather satellites, including polar orbiting satellites and geostationary satellites, radiosondes, automated surface observing systems (ASOS), and numerical weather prediction (NWP). For example, tropical cyclones can spawn dozens of tornadoes that tend to move rapidly, leaving little time to take evasive action. The application of JESTER analysis to Doppler radar data and satellite data could be used for modeling of tropical cyclones tornadoes, leading to improved prediction of formation and landfall.

Example 4: Network Analysis and Resource Provisioning

Networks, consisting of a large number of interconnected points, are formed in many different physical systems. For example, where the points are cities, they may be interconnected by numerous roads and highways, or airline routes, which offer multiple possible pathways to travel from one city to another, or power lines in a large area power grid. The points and interconnecting routes form the network. Nonetheless, what may come to mind first when defining a network is the technological application of the term relating to conduction of an electromagnetic signal between points which are connected by many sections of a conducting medium. The electromagnetic (EM) signal may be electricity or light, which may be conducted through metal wire or cable, or fiber optics, respectively, or may be a broadcast EM signal such as radio frequency (RF), microwave, millimeter wave, or other wireless transmission. The points may be anything capable of receiving and/or transmitting a signal, for example, for purposes of communication or power transmission. In any such network, differences may exist within the interconnections which indicate that one route or pathway may be more desirable than others which would still be capable of achieving the desired transmission. Given the large number of choices offered by the network, a problem arises in managing the transmission from one point to another to handle the signal in the most economical, reliable and/or efficient manner. Other important factors in managing such systems are variations in resource availability, for example, weather, environmental, and atmospheric phenomena, which can be long- or short-term, user demand, which have both spatial and temporal components, maintenance schedules, and other influences.

To provide a high-level example, consider a communications network that could include one or a combination of wired, wireless, and optical transmission media. First, the structural framework of the target region would be defined. This framework could be either 2D, i.e., a flat area, or 3D, to incorporate topographical and, where appropriate, atmospheric data. Thus, the first dataset would essentially be a map of the network coverage area. The second dataset could be detected patterns of usage across the network, e.g., identifying the highest usage pathways and directions. Using GO-ESP, the most likely pathways and directions of demand would be identified, then a coupling matrix would be generated to correlate the pathways and directions to the map of the target. An example of a third dataset could be detected disruptions, e.g., outages, signal fluctuations, and coverage failures over time, using EFD. The outages would then be correlated to the map of the target region to identify patterns useful for prediction of service loss. Using SYMREG and JESTER, all datasets could be registered to evaluate patterns indicating relationships between network demand and communications failures, between weather variations and failures, or other inter-relationships between diverse data that would enhance the predictability of system demands and allow improved resource management and/or pinpoint locations in need of upgrade. Additional useful datasets could be seasonal or short-term weather patterns or trends, which could be integrated using the JESTER approach.

Based on the foregoing description and examples, it will be readily apparent to those of skill in the art that the inventive methods disclosed herein for integration and registration of multi-variate and multi-modal data can be applied to a wide range of spatio-temporal problems to allow more accurate assessment of inter-relationships between structure and function, relating quantitative measures of structural features of a system with the spatio-temporal patterns of parameters. Accordingly, the method is not intended to be limited to only the specific examples provided herein.

REFERENCES (INCORPORATED HEREIN BY REFERENCE)

Balls, G. T., & Frank, L. R. (2009). A simulation environment for diffusion weighted MR experiments in complex media. *Magn Reson Med*, 62 (3), 771-778.

Baxter, G. T., & Frank, L. R. (2013, July). A computational model for diffusion weighted imaging of myelinated white matter. *NeuroImage*, 75 (C), 204-212.

Beggs, J., & Timme, N. (2012). Being critical of criticality in the brain. *Frontiers in Physiology*, 3, 163.

Bell, A., & Sejnowski, T. (1995, November). An information maximization approach to blind separation and blind deconvolution. *Neural Comput*, 7 (6), 1129-1159.

Burda, Z., Duda, J., Luck, J., & Waclaw, B. (2009). Localization of the maximal entropy random walk. *Phys. Rev. Lett.*, 102 (16), 160602.

Calhoun, V. D., Liu, J., & Adali, T. (2009, March). A review of group ICA for fMRI data and ICA for joint inference of imaging, genetic, and ERP data. *Neuroimage*, 45 (1 Suppl), S163-172.

Calhoun, V. D., Potluru, V. K., Phlypo, R., Silva, R. F., Pearlmutter, B. A., Caprihan, A., . . . Adali, T. (2013). Independent component analysis for brain FMRI does indeed select for maximal independence. *PLoS ONE*, 8 (8), 1-8.

Cammoun, L., Gigandet, X., Meskaldji, D., Thiran, J. P., Sporns, O., Do, K. Q., . . . Hagmann, P. (2012, January). Mapping the human connectome at multiple scales with diffusion spectrum MRI. *Journal of Neuroscience Methods*, 203 (2), 386-397.

Chang, C., & Glover, G. H. (2009, October). Effects of model-based physiological noise correction on default mode network anti-correlations and correlations. *Neuroimage*, 47 (4), 1448-1459.

Daubechies, I., Roussos, E., Takerkart, S., Benharrosh, M., Golden, C., D'Ardenne, K., . . . Haxby, J. (2009, June). Independent component analysis for brain fMRI does not select for independence. *P Natl Acad Sci USA*, 106 (26), 10415-10422.

Deco, G., Jirsa, V., McIntosh, A. R., Sporns, O., & Kotter, R. (2009, June). Key role of coupling, delay, and noise in resting brain fluctuations. *Proceedings of the National Academy of Sciences of the United States of America*, 106 (25), 10302-10307.

Deco, G., Jirsa, V. K., & McIntosh, A. R. (2011, January). Emerging concepts for the dynamical organization of resting-state activity in the brain. *Nature Reviews Neuroscience*, 12 (1), 43-56.

Deco, G., McIntosh, A. R., Shen, K., Hutchison, R. M., Menon, R. S., Everling, S., & Jirsa, V. K. (2014, June). Identification of Optimal Structural Connectivity Using Functional Connectivity and Neural Modeling. *The Journal of Neuroscience*, 34 (23), 7910-7916.

Dosenbach, N. U. F., Fair, D. A., Miezin, F. M., Cohen, A. L., Wenger, K. K., Dosenbach, R. A. T., . . . Petersen, S. E. (2007, June). Distinct brain networks for adaptive and stable task control in humans. *Proceedings of the National Academy of Sciences of the United States of America*, 104 (26), 11073-11078.

Douaud, G., Groves, A. R., Tamnes, C. K., Westlye, L. T., Duff, E. P., Engvig, A., . . . Johansen-Berg, H. (2014, December). A common brain network links development, aging, and vulnerability to disease. *Proc. Natl. Acad. Sci. U.S.A.*, 111 (49), 17648-17653.

Enßlin, T. A., Frommert, M., & Kitaura, F. S. (2009, November). Information field theory for cosmological perturbation reconstruction and nonlinear signal analysis. *Phys Rev D*, 80 (10), 105005.

Feynman, R. P. (1949). Space-Time Approach to Quantum Electrodynamics. *Physical Review*, 76 (6), 769-789.

Frank, L. R., & Galinsky, V. L. (2014, March). Information pathways in a disordered lattice. *Phys. Rev. E*, 89, 032142.

Frank, L. R., & Galinsky, V. L. (2016, September). Detecting spatio-temporal modes in multivariate data by entropy field decomposition. *Journal of Physics A Mathematical General*, 49, 395001. doi: 10.1088/1751-8113/49/39/395001

Frank, L. R., & Galinsky, V. L. (2016, September). Dynamic Multiscale Modes of Resting State Brain Activity Detected by Entropy Field Decomposition. *Neural Comput*, 28 (9), 1769-1811.

Galinsky, V. L., & Frank, L. R. (2014, May). Automated Segmentation and Shape Characterization of Volumetric Data. *NeuroImage,* 92, 156-168.

Galinsky, V. L., & Frank, L. R. (2015, May). Simultaneous multi-scale diffusion estimation and tractography guided by entropy spectrum pathways. *IEEE Trans Med Imaging,* 34 (5), 1177-1193.

Galinsky, V. L., & Frank, L. R. (2016a). The Lamellar Structure of the Brain Fiber Pathways. *Neural Computation,* 28, 1-24.

Galinsky, V. L., & Frank, L. R. (2016b). Symplectomorphic registration with phase space regularization by entropy spectrum pathways. arxiv.org/pdf/1706.05105

Glover, G. H., Li, T. Q., & Ress, D. (2000, July). Image-based method for retrospective correction of physiological motion effects in fMRI: RETROICOR. *Magn Reson Med,* 44 (1), 162-167.

Groves, A. R., Beckmann, C. F., Smith, S. M., & Woolrich, M. W. (2011, February). Linked independent component analysis for multimodal data fusion. *Neuroimage,* 54 (3), 2198-2217.

Hagmann, P., Cammoun, L., Gigandet, X., Meuli, R., Honey, C. J., Wedeen, V. J., & Sporns, O. (2008). Mapping the Structural Core of Human Cerebral Cortex. *PLoS Biology,* 6 (7), e159.

Honey, C. J., Kotter, R., Breakspear, M., & Sporns, O. (2007, June). Network structure of cerebral cortex shapes functional connectivity on multiple time scales. *Proceedings of the National Academy of Sciences,* 104 (24), 10240-10245.

Honey, C. J., Sporns, O., Cammoun, L., Gigandet, X., Thiran, J. P., Meuli, R., & Hagmann, P. (2009a, February). Predicting human resting-state functional connectivity from structural connectivity. *Proceedings of the National Academy of Sciences,* 106 (6), 2035-2040.

Honey, C. J., Sporns, O., Cammoun, L., Gigandet, X., Thiran, J. P., Meuli, R., & Hagmann, P. (2009b, February). Predicting human resting-state functional connectivity from structural connectivity. *Proc. Natl. Acad. Sci. U.S.A.,* 106 (6), 2035-2040.

Hyvarinen, A., & Oja, E. (2000). Independent component analysis: algorithms and applications. *Neural Networks,* 13 (4-5), 411-430.

Jaynes, E. (1957a). Information Theory and Statistical Mechanics. *Physical Review,* 106 (4), 620-630.

Jaynes, E. (1957b). Information theory and statistical mechanics. II. *Physical Review,* 108 (2), 171.

Keil, B., Blau, J. N., Biber, S., Hoecht, P., Tountcheva, V., Setsompop, K., ... Wald, L. L. (2013). A 64-channel 3t array coil for accelerated brain mri. *Magnetic Resonance in Medicine,* 70 (1), 248-258.

McMillan, B. (1953). The basic theorems of information theory. *Ann. Math. Stat.,* 24 (2), 196-219.

Mueller, S., Keeser, D., Samson, A. C., Kirsch, V., Blautzik, J., Grothe, M., ... Meindl, T. (2013). Convergent Findings of Altered Functional and Structural Brain Connectivity in Individuals with High Functioning Autism: A Multi-modal MRI Study. *PLoS ONE,* 8 (6), e67329.

Setsompop, K., Gagoski, B. A., Polimeni, J. R., Witzel, T., Wedeen, V. J., & Wald, L. L. (2011, August). Blipped-controlled aliasing in parallel imaging for simultaneous multislice echo planar imaging with reduced g-factor penalty. *Magn Res Med,* 67 (5), 1210-1224.

Setsompop, K., Kimmlingen, R., Eberlein, E., Witzel, T., Cohen-Adad, J., McNab, J . . . Wald, L. (2013). Pushing the limits of in vivo diffusion MRI for the human connectome project. *NeuroImage,* 80 (0), 220-233.

Shannon, C. (1948). A mathematical theory of communication. *Bell Syst. Tech. J.,* 27, 379423, 623656.

Skudlarski, P., Jagannathan, K., Calhoun, V. D., Hampson, M., Skudlarska, B. A., & Pearlson, G. (2008, November). Measuring brain connectivity: diffusion tensor imaging validates resting state temporal correlations. *Neuroimage,* 43 (3), 554-561.

Sotiropoulos, S. N., Moeller, S., Jbabdi, S., Xu, J., Andersson, J. L., Auerbach, E. J., . . . Lenglet, C. (2013). Effects of image reconstruction on fiber orientation mapping from multichannel diffusion mri: Reducing the noise floor using sense. *Magnetic Resonance in Medicine,* 70 (6), 1682-1689. Retrieved from http://dx. doi.org/10.1002/mrm.24623 doi: 10.1002/mrm.24623

Van Essen, D. C., Smith, S. M., Barch, D. M., Behrens, T. E., Yacoub, E., Ugurbil, K., & for the WU-Minn HCP Consortium. (2013, October). The WU-Minn Human Connectome Project: An overview. *NeuroImage,* 80 (C), 62-79.

Van Essen, D. C., Ugurbil, K., Auerbach, E., Barch, D., Behrens, T. E., Bucholz, R., Yacoub, E. (2012, October). The Human Connectome Project: a data acquisition perspective. *Neuroimage,* 62 (4), 2222-2231.

Wedeen, V. J., Hagmann, P., Tseng, W. Y., Reese, T. G., & Weisskoff, R. M. (2005, December). Mapping complex tissue architecture with diffusion spectrum mag-net ic resonance imaging. *Magn Reson Med,* 54 (6), 1377-1386.

Wong, C. W., Olafsson, V., Tal, O., & Liu, T. T. (2013). The amplitude of the resting-state fMRI global signal is related to EEG vigilance measures. *Neuroimage,* 83, 983-990.

Zalesky, A., Fornito, A., Cocchi, L., Gollo, L. L., & Breakspear, M. (2014, July). Time-resolved resting-state brain networks. *Proceedings of the National Academy of Sciences of the United States of America,* 111 (28), 10341-10346.

The invention claimed is:

1. A method for registering multiple image types of diverse modalities for a target volume, the method comprising:

acquiring within a computer processor a first dataset from a first imaging system, the first dataset comprising a first data modality including morphological information comprising intensity data for each spatial location within the target volume;

using the computer processor, generating a spherical wave decomposition (SWD) of the target volume to generate a 3D volume representation of the target volume;

acquiring within the computer processor a second dataset from a second imaging system, the second dataset comprising a second data modality including multiple value vector or tensor field data within the target volume;

using the computer processor, applying a geometric optics-entropy spectrum pathways (GO-ESP) analysis to the second dataset to identify ranked pathways between locations within the target volume;

acquiring within the computer processor a third dataset from a third imaging system, the third dataset comprising a time sequence of values within the target volume;

using the computer processor, applying an entropy field decomposition (EFD) procedure to the third dataset to generate mean field volumes of the target volume;

using the computer processor, registering the ranked pathways and the mean field volumes with the 3D volume representation using symplectomorphic registration (SYMREG) to generate forward and inverse symplectomorphic maps;

using the computer processor, applying GO-ESP global tractography to the symplectomorphic maps and the 3D volume representation to generate entropy spectrum pathway (ESP) long range structural connectivity eigenmodes; and receiving and displaying a registered image corresponding to the registered image data derived from the first, second and third datasets.

2. The method of claim 1, wherein the target volume is a brain and the first dataset comprises high resolution anatomical (HRA) data.

3. The method of claim 1, wherein the target volume is a brain and the second dataset comprises diffusion tensor imaging (DTI) data.

4. The method of claim 1, wherein the target volume is a brain and the third dataset comprises functional magnetic resonance imaging (FMRI) data.

5. The method of claim 1, wherein the target volume is a storm cell and one or more of the first, second, and third datasets comprises Doppler radar data.

6. The method of claim 1, wherein the target volume is a storm cell and one or both of the second and third dataset comprises satellite image data.

7. The method of claim 1, further comprising:
acquiring within the computer processor a fourth dataset from a fourth imaging system, the fourth dataset comprising frequency data;
using the computer processor, generating a frequency-dependent inverse Green function for each fourth dataset and solving for a potential at locations within the target volume.

8. The method of claim 7, wherein the fourth dataset comprises EEG data.

9. The method of claim 8, wherein the EEG data is resting state EEG data.

10. The method of claim 8, wherein the EEG data is task-based EEG data.

11. A method for registering an image of structural-functional activity within a brain from multiple image types of diverse modalities, the method comprising:
acquiring within a computer processor at least at least two datasets associated with a target volume of the brain, the at least two datasets having different modalities comprising at least one MRI modality and an EEG modality, wherein the at least one MRI modality comprises high resolution anatomical (HRA) voxel data for each spatial location within the brain;
using the computer processor, segmenting the HRA voxel data using spherical wave decomposition (SWD) and generating a 3D volume representation of the target volume therefrom;
using the computer processor, constructing a local connectivity matrix comprising one or both of spatial connectivity and temporal connectivity for each of the at least two datasets;
fusing the local connectivity matrices for the at least two datasets into a common coupling matrix by:
generating a frequency-dependent inverse Green function for EEG data of the EEG modality and solving for a potential at each voxel within the target volume;
generating EEG volumes of the signal time courses for a plurality of EEG frequency bands in each voxel; and
extracting space-time modes from the EEG volumes; and
receiving and displaying an image corresponding to a 3D representation of the brain with the registered image data derived from the at least two datasets.

12. The method of claim 11, wherein the EEG modality comprises resting state EEG data.

13. The method of claim 11, wherein the EEG modality comprises task-based EEG data.

14. The method of claim 11, wherein the image comprises EEG functional modes generated for volumes determined from the at least one MRI modality.

15. The method of claim 14, wherein the at least one MRI modality further comprises diffusion tensor imaging (DTI) data and functional magnetic resonance imaging (FMRI) data, and wherein the volumes are determined from a combination of MRI modalities using the computer processor to:
apply a geometric optics-entropy spectrum pathways (GO-ESP) analysis to the DTI data to identify ranked pathways between locations within the target volume;
apply an entropy field decomposition (EFD) procedure to the FMRI data to generate mean field volumes of the target volume;
register the ranked pathways and the mean field volumes with the 3D volume representation using symplectomorphic registration (SYMREG) to generate forward and inverse symplectomorphic maps; and
apply GO-ESP global tractography to the symplectomorphic maps and the 3D volume representation to generate entropy spectrum pathway (ESP) long range structural connectivity eigenmodes.

16. The method of claim 11, wherein the at least one MRI modality further comprises one or more of diffusion tensor imaging (DTI) data and functional magnetic resonance imaging (FMRI) data.

17. The method of claim 11, wherein the at least one MRI modality further comprises diffusion tensor imaging (DTI) data comprising multiple value vector or tensor field data within the target volume and functional magnetic resonance imaging (FMRI) data comprising a time sequence of values within the target volume, wherein the method further comprises the computer processor:
applying a geometric optics-entropy spectrum pathways (GO-ESP) analysis to the DTI data to identify ranked pathways between locations within the target volume;
applying an entropy field decomposition (EFD) procedure to the FMRI data to generate mean field volumes of the target volume;
registering the ranked pathways and the mean field volumes with the 3D volume representation using symplectomorphic registration (SYMREG) to generate forward and inverse symplectomorphic maps;
applying GO-ESP global tractography to the symplectomorphic maps and the 3D volume representation to generate entropy spectrum pathway (ESP) long range structural connectivity eigenmodes; and
generating a frequency-dependent inverse Green function for the EEG modality and solving for a potential at locations within the target volume.

18. A method for registering multiple data types of diverse modalities for a target volume having pathways therein, the method comprising:
acquiring within a computer processor at least at least two datasets associated with the target volume, the at least two datasets having different modalities, a first dataset comprising detected electromagnetic signals transmitted along the pathways and a second dataset comprising voxel data associated with one or more of geometric, structural, and electrical properties of the target volume;

using the computer processor, segmenting the voxel data using spherical wave decomposition (SWD) and generating a 3D volume representation of the target volume therefrom;

using the computer processor, constructing a local connectivity matrix comprising one or both of spatial connectivity and temporal connectivity for each of the at least two datasets;

fusing the local connectivity matrices for the at least two datasets into a common coupling matrix by:
    generating a frequency-dependent inverse Green function for the detected electromagnetic signals and solving for a potential at each voxel within the target volume;
    generating electromagnetic signal volumes for a plurality of electromagnetic signal frequency bands in each voxel; and
    extracting space-time modes from the electromagnetic signal volumes; and receiving and displaying an image corresponding to a registered image derived from the at least two datasets.

19. The method of claim 18, wherein the target volume is a brain and the second dataset is high resolution anatomical (HRA) data, wherein the HRA data is used to extract at least gray matter and white matter areas within the brain.

20. The method of claim 19, further comprising a third dataset comprising diffusion tensor imaging (DTI) data, wherein the DTI data is registered with the HRA data to construct estimates of conductivity anisotropy within the brain.

21. The method of claim 20, further comprising a fourth dataset comprising functional magnetic resonance imaging (FMRI) data, wherein the FMRI data is registered with the HRA data to construct inhomogeneous permittivity tissue maps within the brain.

22. The method of claim 18, wherein the target volume is a brain and the first dataset is EEG or MEG data.

23. A method for registering an image of structural-functional activity within a brain from multiple image data types of diverse modalities, the method comprising:
    acquiring within a computer processor high resolution anatomical (HRA) data; using the computer processor, segmenting the HRA data using spherical wave decomposition (SWD) to identify tissues within a target volume comprising a plurality of voxels;
    acquiring within the computer processor diffusion tensor imaging (DTI) data;
    using the computer processor, registering the DTI data with the HRA data to construct anisotropy conductivity tissue maps within the target volume;
    acquiring within the computer processor functional magnetic resonance imaging (FMRI) data;
    using the computer processor, registering the FMRI data with the HRA data to construct inhomogeneous permittivity tissue maps within the target volume;
    acquiring within the computer processor EEG data comprising electrostatic potentials collected from an array of sensors at a plurality of frequency bands;
    using the computer processor:
        generating a frequency-dependent inverse Green function for the EEG data and solving for a potential at each voxel within the target volume;
        generating EEG volumes of signal time courses in each voxel for the plurality of frequency bands; and
        extracting space-time modes from the EEG volumes; and
    receiving and displaying an image corresponding to the registered image data derived from the multiple image date types.

* * * * *